(12) United States Patent
Bryan et al.

(10) Patent No.: US 7,522,573 B2
(45) Date of Patent: *Apr. 21, 2009

(54) SELF COORDINATED MACHINE NETWORK

(75) Inventors: Roland F. Bryan, Santa Barbara, CA (US); Mark P. Harris, Santa Barbara, CA (US); Chris T. Kleveland, Santa Barbara, CA (US)

(73) Assignee: MachineTalker Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/653,617

(22) Filed: Jan. 16, 2007

(65) Prior Publication Data

US 2007/0127429 A1    Jun. 7, 2007

Related U.S. Application Data

(62) Division of application No. 10/131,165, filed on Apr. 23, 2002, now Pat. No. 7,184,423.

(51) Int. Cl.
*H04Q 7/24* (2006.01)
(52) U.S. Cl. ...................................... 370/338
(58) Field of Classification Search ................ None
See application file for complete search history.

(56) References Cited

U.S. PATENT DOCUMENTS

| | | | | |
|---|---|---|---|---|
| 6,842,460 | B1 * | 1/2005 | Olkkonen et al. | 370/465 |
| 7,027,773 | B1 * | 4/2006 | McMillin | 455/41.2 |
| 7,126,926 | B1 * | 10/2006 | Bjorklund et al. | 370/328 |

\* cited by examiner

*Primary Examiner*—Wing F Chan
*Assistant Examiner*—Anthony Sol
(74) *Attorney, Agent, or Firm*—Mark Rodgers

(57) ABSTRACT

A self coordinated machine network is established by two or more machines in proximity with each other via a wired or wireless network infrastructure. The machines are configured to establish an ad hoc network between themselves for sharing information related to their common applications. New machines that come into proximity of the network infrastructure are configured to join an existing ad hoc network. Machines that power down or are removed from proximity of the network infrastructure are eliminated from the ad hoc network. Communications between the constituent machines of the ad hoc network allow the machines to self coordinate the network and redundantly store information pertaining to the common and disparate applications of the various machines that comprise the self coordinated machine network.

19 Claims, 32 Drawing Sheets

| HOST INTERACTION SOFTWARE | COMMUNITY INTERACTION SOFTWARE | REMOTE INTERACTION SOFTWARE | INTERNAL CONTROL SOFTWARE | SPECIAL SUBROUTINES |
|---|---|---|---|---|
| SUBROUTINE 01 | COMMON SUBROUTINE | SUBROUTINE 11 | SUBROUTINE 21 | SUBROUTINE 31 |
| SUBROUTINE 02 | BRANCH MACHINE A | SUBROUTINE 12 | SUBROUTINE 22 | SUBROUTINE 32 |
| SUBROUTINE 03 | BRANCH MACHINE B | SUBROUTINE 13 | SUBROUTINE 23 | SUBROUTINE 33 |
| ⋮ | ⋮ | ⋮ | ⋮ | ⋮ |
| SUBROUTINE 0X | BRANCH MACHINE X | SUBROUTINE 1X | SUBROUTINE 2X | SUBROUTINE 3X |

FIG. 14

| MACHINE A INTERACTION | MACHINE B INTERACTION | MACHINE C INTERACTION | ... | MACHINE X INTERACTION |
|---|---|---|---|---|
| UNIQUE PROGRAM? | UNIQUE PROGRAM? | UNIQUE PROGRAM? | ... | UNIQUE PROGRAM? |
| UNIQUE PROGRAM? | UNIQUE PROGRAM? | UNIQUE PROGRAM? | ... | UNIQUE PROGRAM? |
| ⋮ | ⋮ | ⋮ | ⋮ | ⋮ |
| UNIQUE PROGRAM? | UNIQUE PROGRAM? | UNIQUE PROGRAM? | ... | UNIQUE PROGRAM? |

FIG. 15

| HOST PERSONALITY | MACHINE A PERSONALITY | MACHINE B PERSONALITY | . . . | MACHINE X PERSONALITY |
|---|---|---|---|---|
| FEATURE 1 | FEATURE 1 | FEATURE 1 | . . . | FEATURE 1 |
| FEATURE 2 | FEATURE 2 | FEATURE 2 | . . . | FEATURE 2 |
| FEATURE 3 | FEATURE 3 | FEATURE 3 | . . . | FEATURE 3 |
| ⋮ | ⋮ | ⋮ | ⋮ | ⋮ |
| FEATURE X | FEATURE X | FEATURE X | SUBROUTINE 2X | FEATURE X |

FIG. 16

| HOST CUSTOM | MACHINE A CUSTOM | MACHINE B CUSTOM | . . . | MACHINE X CUSTOM |
|---|---|---|---|---|
| UNIQUE FEATURE? | UNIQUE FEATURE? | UNIQUE FEATURE? | . . . | UNIQUE FEATURE? |
| UNIQUE FEATURE? | UNIQUE FEATURE? | UNIQUE FEATURE? | . . . | UNIQUE FEATURE? |
| ⋮ | ⋮ | ⋮ | ⋮ | ⋮ |
| UNIQUE FEATURE? | UNIQUE FEATURE? | UNIQUE FEATURE? | . . . | UNIQUE FEATURE? |

FIG. 17

SELF COORDINATED MACHINE NETWORK

RALETED APPLICATION

This application is a divisional of U.S. application Ser. No. 10/131,165, filed Apr. 23, 2002 now U.S. Pat. No. 7,184,423

BACKGROUND

1. Field of the Invention

The present invention is generally related to networking and more particularly related to ad hoc networks of intelligent devices that are self coordinated over a wired or wireless network infrastructure.

2. Related Art

Conventional machines, depending on their date of manufacture and their intended use, typically contain a great deal of information. For example, a conventional vending machine may contain information relating to its internal status and its inventory of products. A conventional assembly line machine may also contain information relating to its status and inventory, in addition to information relating to its uptime, throughput, and perhaps error rate. Various other types of conventional machines similarly maintain information useful to the manufacturers, owners, users, and maintenance crews associated with the particular machine.

Staying with the vending machine example, conventional machines that have been manufactured within the last decade or so typically have the ability to provide status information and also have the ability to receive limited operational control and initialization set up data from an external source.

In the vending machine industry, some companies are pushing for automation and attempting to introduce new products for interacting with vending machines. For example, some conventional products for interacting with vending machines include a bi-directional exchange capability whereby the vending machine can communicate with an external transmitting device. Typically, the external transmitting device can physically plug into the vending machine or establish a wireless connection with the vending machine in order to exchange information with the vending machine.

Generally, the information exchange between the external transmitting device and the vending machine concerns financial data relating to a sales transaction and the movement of funds. Various different external transmitting devices have been employed, including programmable cell phones and "smart" hand held storage devices containing available finds (e.g. "SmartCard" and "eSecure").

For the last several years in the vending machine industry, software systems have been developed to manage certain functions with respect to a wide installed base of vending machines, including systems for accounting, inventory control, delivery route planning (e.g. for re-stocking), emergency repair scheduling, and many other related tasks. To obtain the necessary information for remote management of these functions, software utilities are being developed for moving data from the vending machines to a central processing site in order to carry out these planning and accounting functions.

Another recent improvement in the vending machine industry to simplify the gathering of data from vending machines has been the adoption of rules that govern the content of messages passed to and from vending machines. In particular, the Data Exchange Uniform Code Standard is slowly being adopted by manufacturers and software providers with the positive result being standardized access to vending machine information without having to create custom solutions. This standard also specifies the type of external connection that is wired into a given machine for attachment of the data gathering device.

Other industries have also developed and adopted standards that aid in the gathering of information from their industry specific machines. For example, protocols exist for Automated Machine Tool Control in manufacturing. Standard protocols exist on how to talk to laser machines, how to control welders and cutting machines and how to run production lines. Such protocols are an established part of the manufacturing industry.

One drawback of the parallel progression made by the various industries is the ubiquitous tendency for the protocols implemented by a particular industry to be unique to that industry. Another drawback that spans the various industries is the lack of established standards for information content. In the vending machine industry, for example, agreement on standardization has taken 13 years and it is still being modified. This type of problem persists throughout the various industries due to the generally large number of different types of machines within a single industry that have been designed over time to solve various problems unique to the industry.

Many other industries have not yet found the need (or the means) to establish common communication and machine control standards. Additionally, the parallel progression by the various industries has made migration of any conventional communication and machine control standards across industries extremely untenable. Finally, in most cases where methods have been developed to facilitate communication, such exchange of information is typically only between a single machine and some centralized entity. In these conventional systems, the central entity usually issues commands, requests status and other information, and delivers updates while the machine typically delivers the requested information and also may issue alerts.

Therefore, what is needed is a system and method that overcomes these significant problems found in the conventional systems as described above.

SUMMARY

The present invention provides for ad hoc machine networks that are self coordinated in a wired, wireless, or combination wired and wireless network infrastructure. Machines that come into proximity of an existing self coordinated machine network are configured to join the existing network. Machines that come into proximity with each other where no self coordinated machine network exists are similarly configured to establish an ad hoc network. Information pertaining to the machines in a self coordinated machine network is redundantly stored on the participant machines to facilitate various applications adaptable to benefit from the self coordinated network.

A similar intra machine self coordinated network can be established by the components that make up a single machine. For example, the single machine could be a self contained sub-assembly of a larger machine. Particular examples may include a tail light assembly in an automobile, a keyboard in a computer, a card reader, a bill validator, and any electronic component devices of larger machines. Advantageously, a wireless implementation of the present invention in these particular examples can eliminate the need for cabling within and between such sub-assemblies.

Finally, the present invention provides for ad hoc networks of intelligent devices that are affixed to machines or containers of material or any other entity that needs definition or representation. The intelligent device represents the characteristics, profile, inventory, and other desirable data for a machine, container, or other entity. For example, with respect to a container, the intelligent device may maintain an inventory of the contents and the relationship of those contents to other containers. Advantageously, the containers can be in storage or in transit. For other types of entities the intelligent device brings the ability to report information related to the entity to which the device is attached and to coordinate the entity's relationship with other entities in the self coordinated network of devices.

The present invention also provides novel processes whereby decision making is distributed out to the machines comprising the ad hoc network. At each respective machine, a local, inexpensive, adapter module (referred to herein as a "MachineTalker™", "Talker™", "MicroTalker™", "Macro-Talker™", or "MiniTalker™") serves as an intelligent proxy for the host machine. The module is provided with programmable intelligence to make decisions based upon information provided by the host machine, by other machines, and by remote stations. Each MachineTalker™ device is capable of performing diagnostics, transmitting status reports on itself and on other machines in its community, and accepting set up commands from qualified sources. Adapting machines with MachineTalker™ devices dramatically increases the amount of information available and thereby makes operations much more efficient. MachineTalker™ devices can be attached to older machines by retrofitting or they can be integrated with newly manufactured newer machines.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 14 is a block diagram illustrating an example memory allocation for software subroutines according to an embodiment of the present invention;

FIG. 15 is a block diagram illustrating an example memory allocation for machine specific interaction programs according to an embodiment of the present invention;

FIG. 16 is a block diagram illustrating an example memory allocation for machine specific characteristics according to an embodiment of the present invention;

FIG. 17 is a block diagram illustrating an example memory allocation for machine specific unique features according to an embodiment of the present invention;

DETAILED DESCRIPTION

Certain embodiments as disclosed herein provide for systems and methods for creating, maintaining, and communicating within self coordinated machine networks. For example, one method as disclosed herein allows for a new machine or a newly network capable machine to power up and join a local community of networked machines. The machine joining the community is able to determine its place in the community network, determine the function of its machine, provide redundant storage of network critical information, and participate in the maintenance of the self coordinated network.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
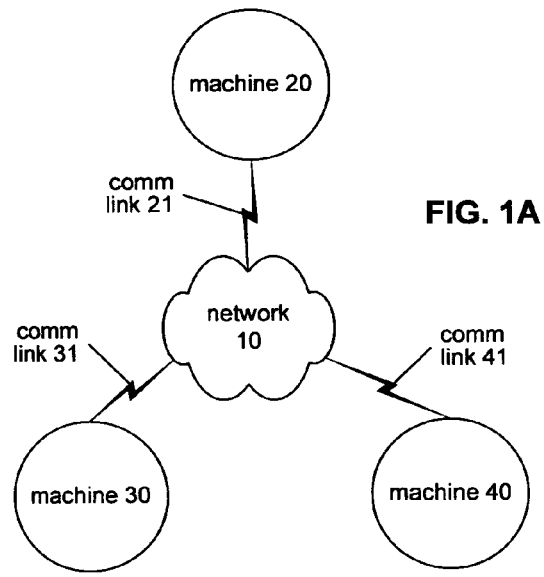
FIGS. 1A-1C are local area network diagrams illustrating example homogeneous self coordinated machine networks and their respective inter-machine communication paths according to various embodiments of the present invention.

FIG. 1A is a local area network diagram illustrating an example homogeneous self coordinated machine network 10 according to an embodiment of the present invention. The network 10 comprises machine 20, machine 30, and machine 40. In alternative embodiments, there may be more or less machines connected to network 10. Machine 20 is connected to network 10 via communication link 21. Machine 30 is connected to network 10 via communication link 31. Machine 40 is connected to network 10 via communication link 41.

The various machines connected to network 10, for example machine 20, can be any sort of optical, chemical, electrical, mechanical, electromechanical, or computerized, device. A machine such as machine 20 can also be a device possessing any combination of the aforementioned features or control mechanisms. In the preferred embodiment, a machine (e.g., machine 20, machine 30, or machine 40) is a device in which an action takes place in response to a stimulus.

Network 10 may employ a wired or wireless infrastructure. For example, network 10 may comprise physical cable with access points available to the various machines that are connected to the network 10. As will be understood by those having skill in the art, the transport medium for network 10 may employ any of a variety of wired carrier mediums. Examples of wired carrier mediums include RJ-45, RJ-11, twisted pair, ethernet, thick net, thin net, and coaxial cable, just to name a few. The transport protocol may also employ a variety of protocols including TCP/IP, Token Ring, and SNA, just to name a few.

Additionally, the transport medium for network 10 may employ a wireless carrier medium with a wireless transport protocol. Examples of wireless networking protocols include bluetooth and 802.11, among others. The various communication links 21, 31, and 41 may be of any variety of communication links. For example, communication link 21 may be a wireless communication link. Examples of wireless communication links include bluetooth, 802.11, and infrared. Additional wireless communication protocols and implementations may also be employed, as will be understood by those skilled in the art. Alternatively, communication link 21 may be a wired communication link. The wired communication link may be configured to adapt to any variety of wired network infrastructure, including ethernet, thin net, RJ-45, RJ-15, universal serial bus ("USB"), coaxial cable, just to name a few.

Implementation of the respective communication links for the various machines comprising network 10 may include all wireless connections, all wired connections, or some combination of the wired and wireless connections. Advantageously, wireless connections may provide the most flexibility with respect to adding and removing machines from the network 10. Furthermore, implementation of network 10 can be a combination of wired and wireless infrastructure.

Figure 1B:
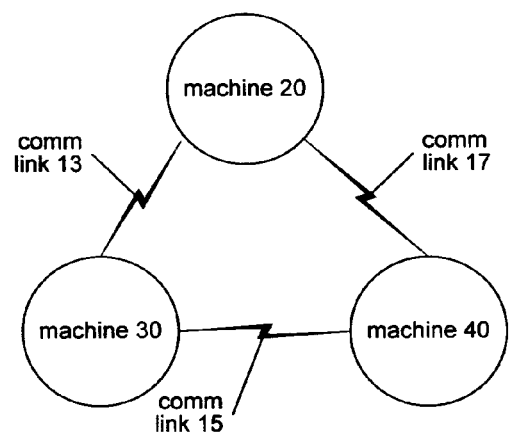

FIG. 1B is a local area network diagram illustrating an example of communication paths between machines in the self coordinated machine network of FIG. 1. In the illustrated embodiment, the self coordinated machine network comprises machines 20, 30, and 40. The machines are communicatively coupled via communication links 13, 15, and 17. The implementation of the communication links 13, 15, and 17 may be wired or wireless. Additionally, the illustrated embodiment employs peer-to-peer communication between the various machines in the self coordinated network.

For example, communication between machine 20 and machine 30 takes place over communication link 13, which may employ a wired or wireless communication channel. Similarly, communication between machine 30 and machine 40 takes place over communication link 15, which also may employ a wired or wireless communication channel. Finally, communication between machine 20 and machine 40 takes place over communication link 17, which may employ a wired or wireless communication channel. Moreover, the self coordinated network may comprise more or fewer machines than the illustrated embodiment with three machines. In these alternative embodiments, a peer-to-peer communication link preferably exists between each pair of machines connected to the self coordinated network.

Figure 1C:
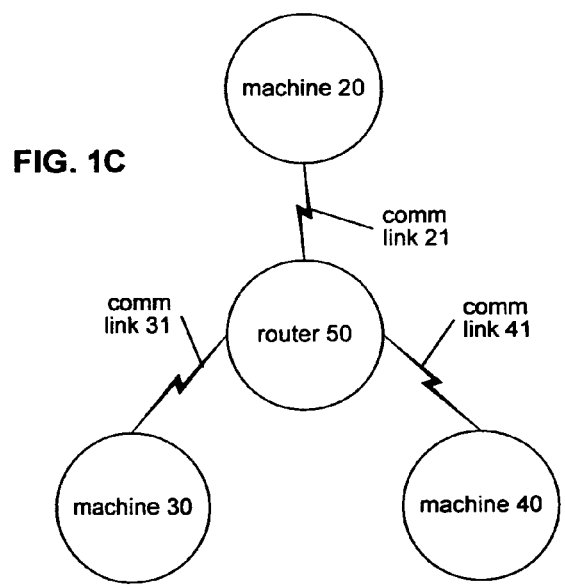

FIG. 1C is a local area network diagram illustrating another example of communication paths between machines in the self coordinated machine network of FIG. 1. In the illustrated embodiment, the self coordinated machine network comprises machines 20, 30, and 40. Communication between the various machines takes place through a router 50. For example, machine 20 is communicatively coupled with router 50 through communication link 21. Communication link 21 may employ a wired or wireless communication channel. Similarly, machine 30 is communicatively coupled with router 50 via communication link 31. Communication link 31 may also employ a wired or wireless communication channel. Finally, machine 40 is communicatively coupled with router 50 via communication link 41. Communication link 41 may also employ a wired or wireless communication channel.

An advantage of the embodiment illustrated in FIG. 1C is recognized in a wireless network implementation. In such an embodiment, router 50 may control the assignment of network communication addresses for each of the various machines that comprise the self coordinated machine network. For example, router 50 may dynamically assign an Internet protocol ("IP") network address to each machine in the network. In this fashion, each machine that joins the network is configured for communication through the router and the passing of packets back and forth between the machines in the self coordinated network is managed by the router 50.

Figure 2:
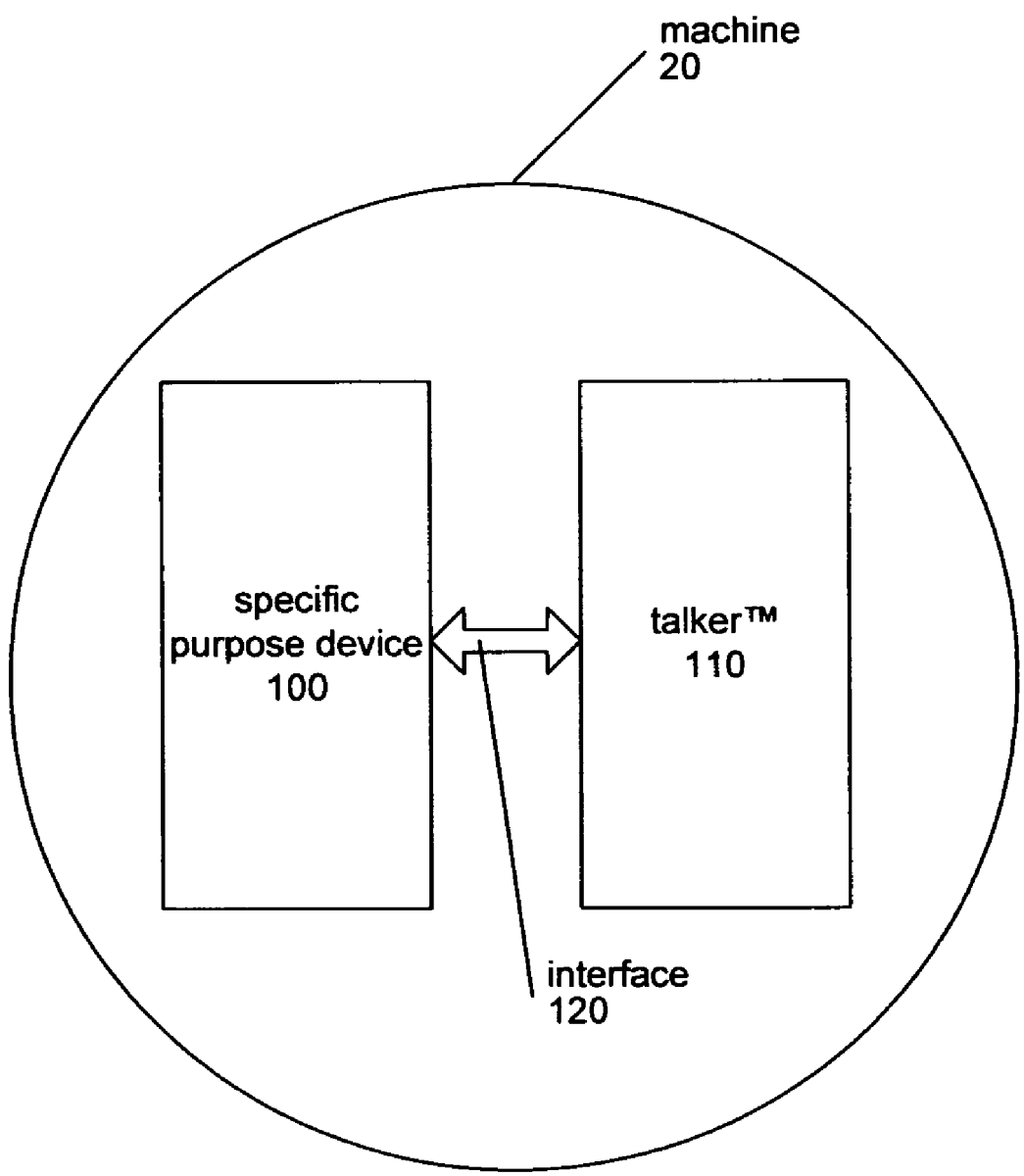
FIG. 2 is a block diagram illustrating the components of an example machine according to an embodiment of the present invention.

FIG. 2 is a block diagram illustrating the components of an example machine 20 according to an embodiment of the present invention. The machine 20 comprises a specific purpose device 100 and a Talker™ 110. The device 100 and the Talker™ 110 are communicatively coupled via an interface 120. The device 100 preferably carries out the basic function of the machine 20. For example, in an embodiment where the machine 20 is a laundry machine, device 100 comprises the computer, electrical, and mechanical components of the machine 20 that carry out the specific purpose for the machine 20, e.g., washing clothes, drying clothes, etc. Other examples of the functions of device 100 include vending, currency exchange, car wash, parking meter, television, and garage door opener, just to name a few.

The Talker™ 110 provides the communication capability for machine 20. Talker™ 110 can be configured to communicate over a wired or wireless network medium and is preferably adaptable to communicate with peer Talkers™ and other types of devices. For example, Talker™ 110 may communicate with the Talkers™ in the other machines that are in the same local network. Additionally, Talker™ 110 may communicate with local or remote control stations, user access stations, or audit stations.

The interface 120 is adaptable to allow communication between the native device 100 and the Talker™ 110. Interface 120 may be implemented in a physical wire or collection of wires (e.g., cable), a standardized plug, a multiplexor, or the like. Interface 120 may also be implemented using a wireless radio link, for example infrared or bluetooth. The protocol used to communicate between the Talker™ 110 and the native device 100 can be a standard protocol or a proprietary protocol. Interface 120 is advantageously capable of being configured for any type of communication between the native device 100 and the Talker™ 110.

Figure 3A:
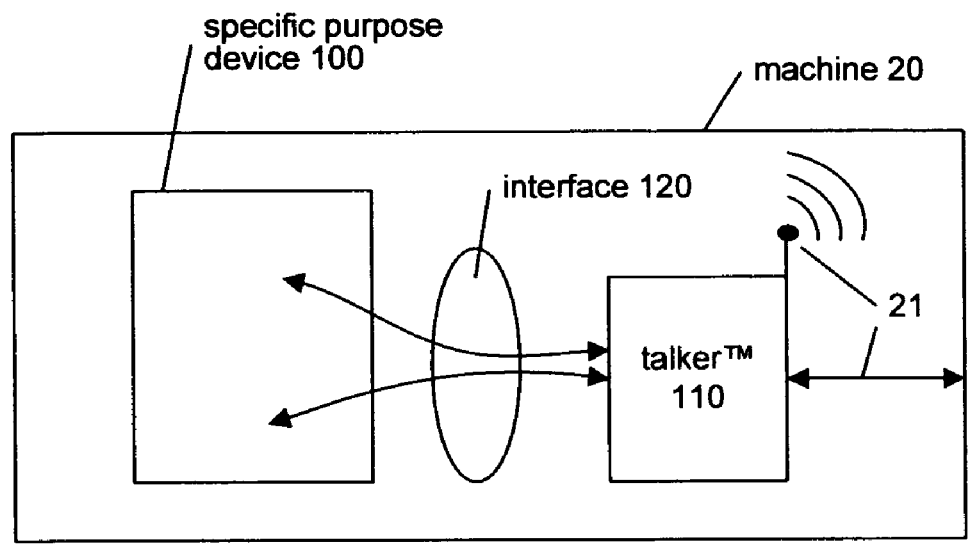
FIGS. 3A-3D are block diagrams illustrating example interfaces between components of a machine according to an embodiment of the present invention.

FIGS. 3A-3D are block diagrams illustrating example interfaces between components of machine 20 according to an embodiment of the present invention. In FIG. 3A, machine 20 comprises specific purpose device 100 and Talker™ 110. Talker™ 110 is configured to communicate via a wired or wireless communication link 21. Additionally, specific purpose device 100 is communicatively coupled with Talker™ 110 via interface 120. The illustrated interface 120 comprises a simple two wire connection between Talker™ 110 and device 100. Such a simple interface 120 may be advantageously employed in legacy machines that possess few data collection points and are, for example, more mechanical in nature.

Advantageously, Talker™ 110 is configured to sense communication signals from one or all of the wires in simple interface 120. Additionally, Talker™ 110 is configured to provide communication signals to device 100 over one or all of the wires in simple interface 120. Preferably, device 100 is similarly configured to provide and receive communication signals on one or all of the wires of simple interface 120.

Figure 3B:
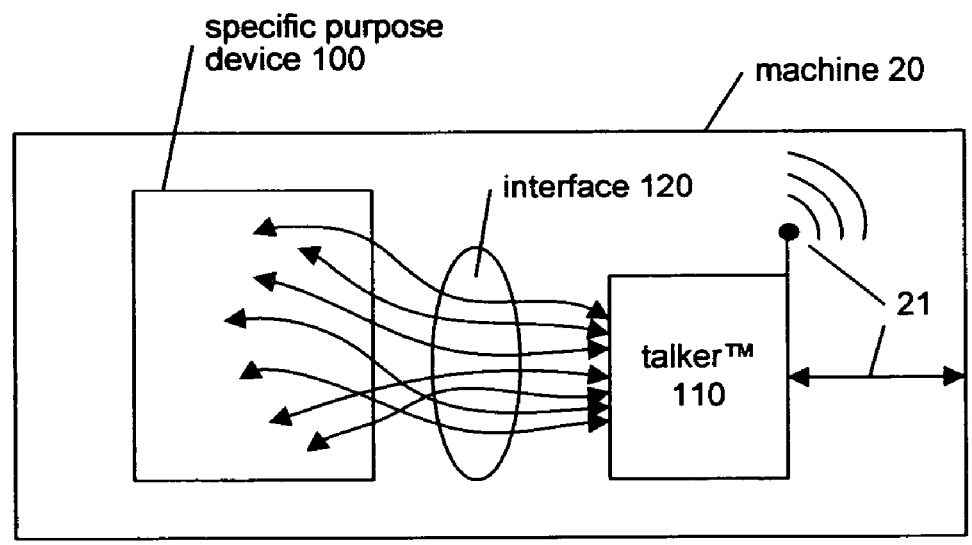

In FIG. 3B, machine 20 comprises specific purpose device 100 and Talker™ 110. Talker™ 110 is configured to communicate via a wired or wireless communication link 21. Additionally, specific purpose device 100 is communicatively coupled with Talker™ 110 via interface 120. The illustrated interface 120 comprises a complex multi-wire connection between Talker™ 110 and device 100. Such a complex interface 120 may be advantageously employed in more modern machines that possess many data collection points and are, for example, more electrical in nature.

Advantageously, Talker™ 110 is configured to sense communication signals from one or all of the wires in complex interface 120. Additionally, Talker™ 110 is configured to provide communication signals to device 100 over one or all of the wires in complex interface 120. Preferably, device 100 is similarly configured to provide and receive communication signals on one or all of the wires of complex interface 120.

Figure 3C:
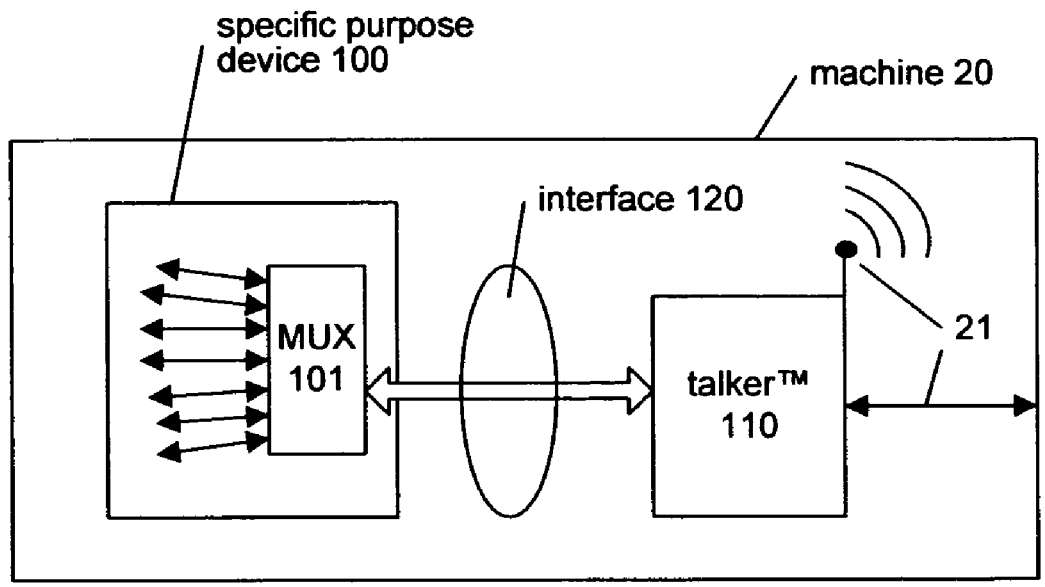

In FIG. 3C, machine 20 comprises specific purpose device 100 and Talker™ 110. Talker™ 110 is configured to communicate via a wired or wireless communication link 21. Specific purpose device 100 is communicatively coupled with Talker™ 110 via interface 120. The illustrated interface 120 comprises a multiplexed connection between Talker™ 110 and device 100. Such a multiplexed interface 120 may be advantageously employed in very modern machines that possess many data collection points and intelligent controllers and are, for example, more computerized in nature.

Advantageously, Talker™ 110 is configured to communicate with multiplexor 101 over interface 120. Talker™ 110 can preferably send communication signals to device 100 over interface 120. Similarly, Talker™ 110 can preferably receive communication signals from device 100 via interface 120. Multiplexor 101 preferably performs the function of communicating with the various data points and actuation points in the device 100. Signals destined for or originating from device 100 are advantageously processed by multiplexor 101, which also serves as a communication focal point for Talker™ 110 via interface 120.

Figure 3D:
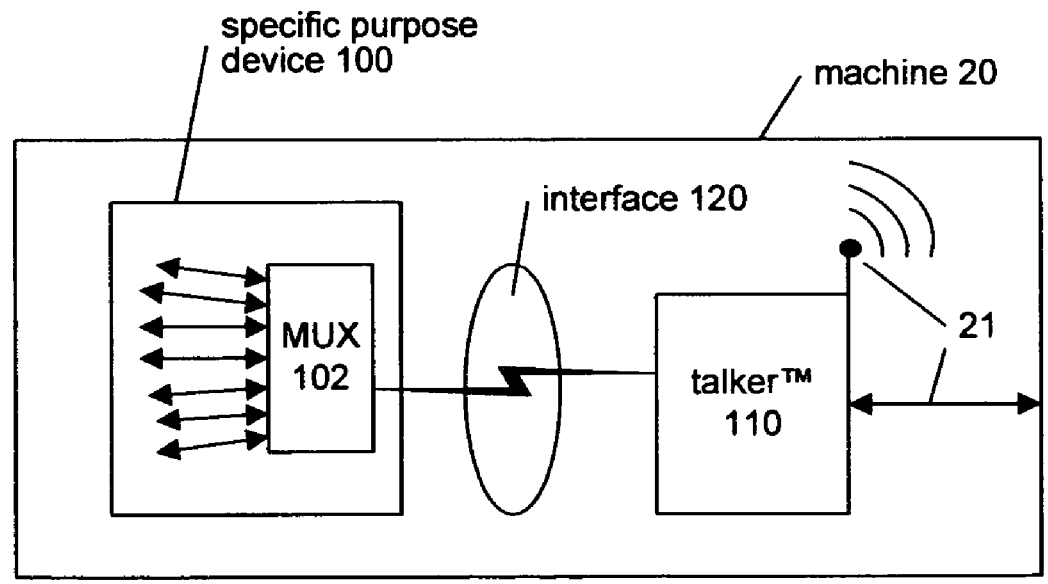

In FIG. 3D, machine 20 comprises specific purpose device 100 and Talker™ 110. Talker™ 110 is configured to communicate via a wired or wireless communication link 21. Specific purpose device 100 is communicatively coupled with Talker™ 110 via interface 120. The illustrated interface 120 comprises a wireless multiplexed connection between Talker™ 110 and device 100.

Advantageously, Talker™ 110 is configured to communicate with multiplexor 102 over wireless interface 120. Talker™ 110 can preferably send communication signals to device 100 over wireless interface 120. Similarly, Talker™ 110 can preferably receive communication signals from device 100 via wireless interface 120. Multiplexor 101 preferably performs the function of communicating with the various data points and actuation points in the device 100. Signals destined for or originating from device 100 are advantageously processed by multiplexor 101, which also serves as a communication focal point for Talker™ 110 via wireless interface 120.

Figure 4A:
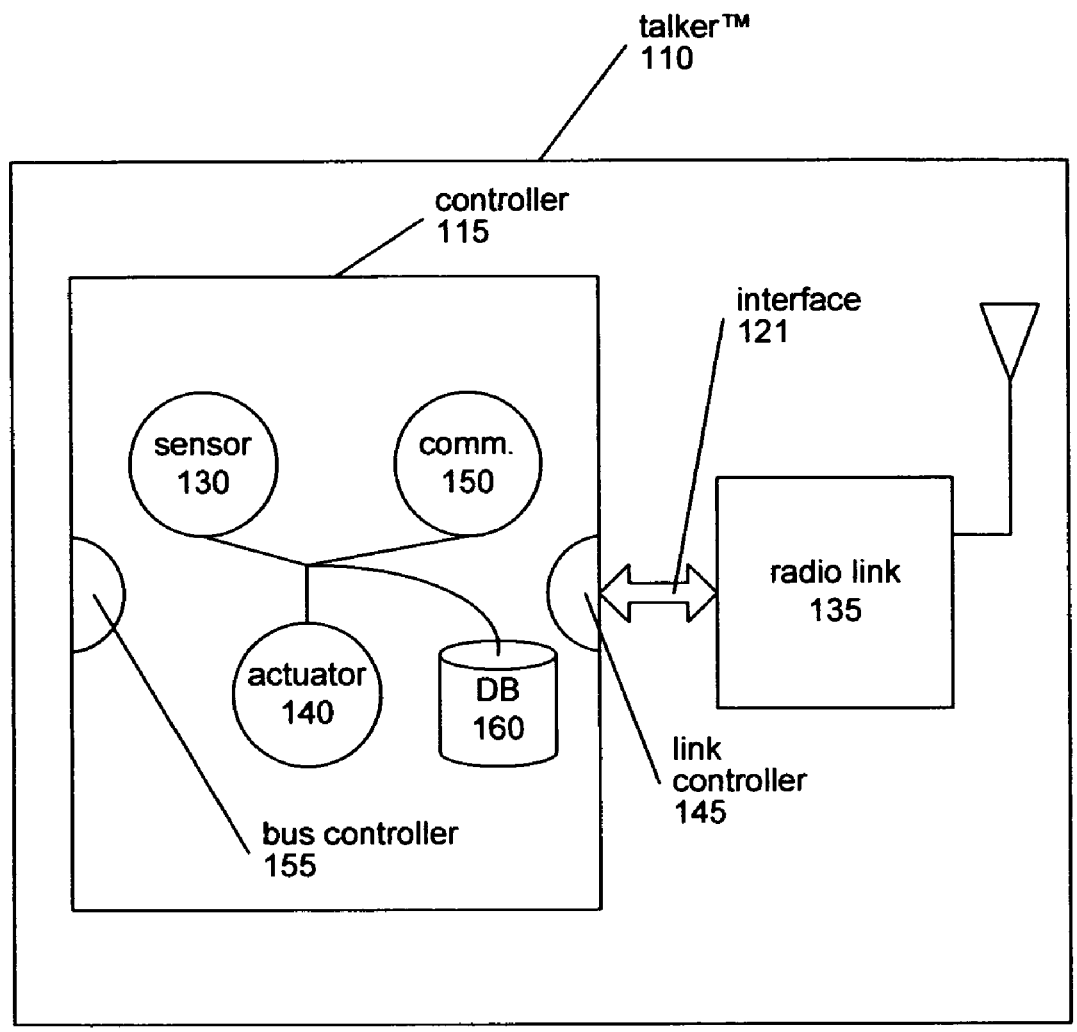
FIGS. 4A-4B are block diagrams illustrating the components of an example MachineTalker™ according to an embodiment of the present invention.
Figure 4B:
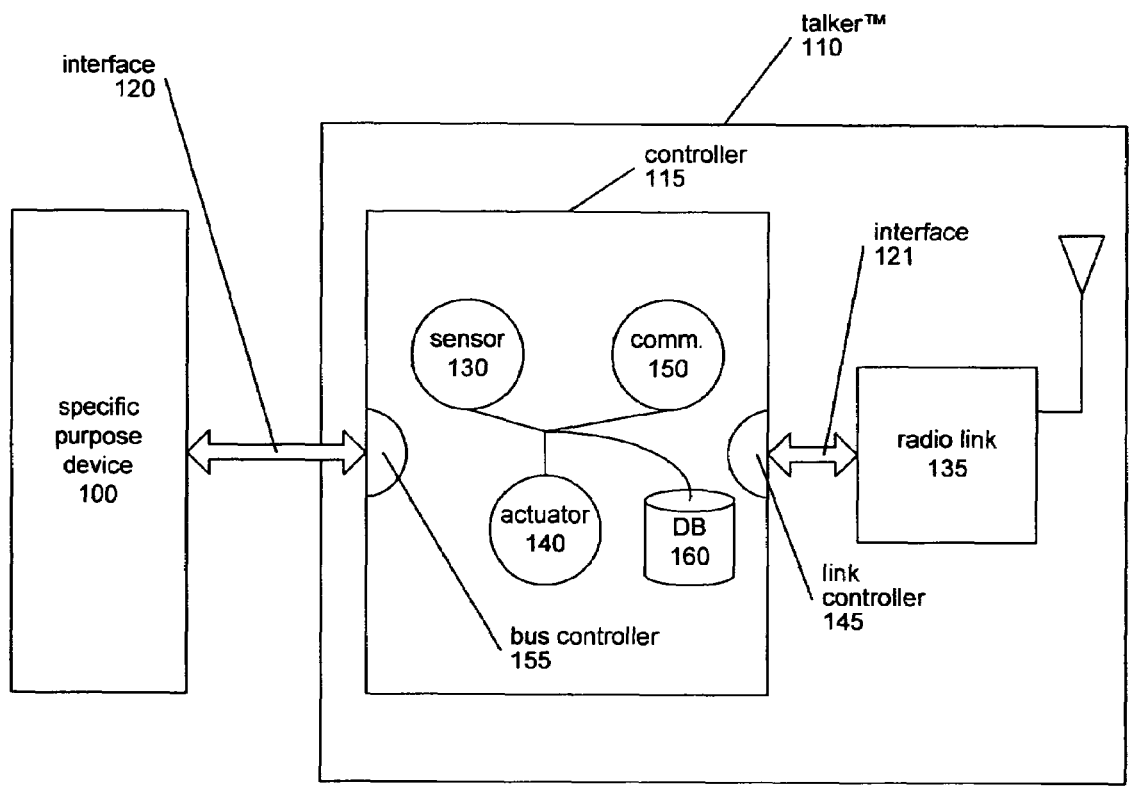

FIGS. 4A and 4B are block diagrams illustrating the components of an example Talker™ 110 according to an embodiment of the present invention. Talker™ 110 comprises a controller 115 that is communicatively coupled with a radio link 135 via an interface 121. In an alternative embodiment, a physical link (not shown) can be substituted for radio link 135 if the Talker™ 110 is communicatively coupled with a physical network. Furthermore, a physical link (not shown) may be included in combination with the radio link 135 for a Talker™ 110 that is configured for both wired and wireless communication. Although a physical link alone or in combination may be included in alternative embodiments of Talker™ 110, for the purposes of description herein, the Talker™ 110 will be described with respect to a wireless communication embodiment.

Radio link 135 performs the function of sending and receiving communications over a wireless communication channel. Various wireless communication protocols may be employed by radio link 135, for example, bluetooth and 802.11. Communications are passed between radio link 135 and controller 115 via interface 121. In a preferred embodiment, interface 121 may be implemented as a communications bus that is in electrical communication with both the controller 115 and the radio link 135.

Controller 115 can be any of a variety of commercially available, customized, or proprietary controllers or processors that possess the ability to execute instructions such as firmware or software applications. Additionally, controller 115 preferably is configurable to manage various communication modules. In the illustrated embodiment, controller 115 comprises a sensor 130, an actuator 140, a communicator 150, a link controller 145, a bus controller 155 and a data storage area 160.

Bus controller 155 and link controller 145 are configurable to monitor and handle communications with other components of the Talker™ 110 or external devices. For example, link controller 145 can be configured to manage all aspects of communication with the radio link 135. Additionally, bus controller 155 can be configured to handle all aspects of communication with an internal or external communication bus (not shown).

Sensor 130 can advantageously be implemented as a hardware component or a software module. In one embodiment, sensor 130 is implemented as a separate unit, for example an ASIC, and is communicatively coupled with controller 115 via bus controller 155 and a communication bus (not shown). Alternatively, sensor 130 may be implemented as a combination software module that works in tandem with a physical sensor unit located external to Talker™ 110 or located within Talker™ 110 (not shown). Moreover, sensor 130 is preferably communicatively coupled with data storage area 160 and is configured to store information therein. In any implementation, the function of sensor 130 is to gather information from external or internal devices.

Actuator 140 can be implemented entirely as a software module that is communicatively coupled with an external device through bus controller 155. Actuator 140 preferably is configured to cause the external device to take action or otherwise change state or report information back to actuator 140. Furthermore, sensor 130 is preferably communicatively coupled with data storage area 160 and is configured to store information therein. Actuator 140 may also be implemented with a combination of hardware and software. For example, actuator 140 may be implemented as an ASIC with streamlined controlling software that causes the integrated circuit to initiate actions in an external device. In any implementation, however, the function of actuator 140 is to cause a device to take an action or otherwise change state or provide information.

Communication module 150 is preferably implemented as a software module that is configured to manage communications within controller 115, within Talker™ 110, and also between Talker™ 110 and external devices. Communications between an external device and sensor 130 or actuator 140 can advantageously be managed by communications module 150. Communications module 150 is also communicatively coupled with data storage area 160.

The data storage area 160 can be implemented using on chip memory or some other type of data storage device. The function of the data storage area 160 is to house information germane to the operation of the Talker™ 110.

Link controller 145 manages the communications with radio link 135 that take place over interface 121. The link controller 145 can preferably be configured to communicate over a variety of interfaces 121 and with a variety of radio link modules, for example a bluetooth radio link module or an 802.11 radio link module.

Turning now to FIG. 4B, bus controller 145 manages the communications with any internal or external communication busses (not shown) that are communicatively coupled with controller 115. For example, an internal communication bus may provide communication with ASIC devices that are integral to the Talker™ 110. Alternatively, an external communication bus may provide communication with an external device such as a sensor (not shown) or a specific purpose device 100. In an embodiment where bus controller 155 handles communication with an external device such as specific purpose device 100, bus controller 155 is preferably configured to communicate via an interface 120 that is particularly adapted to the specific purpose device 100.

Figure 5:
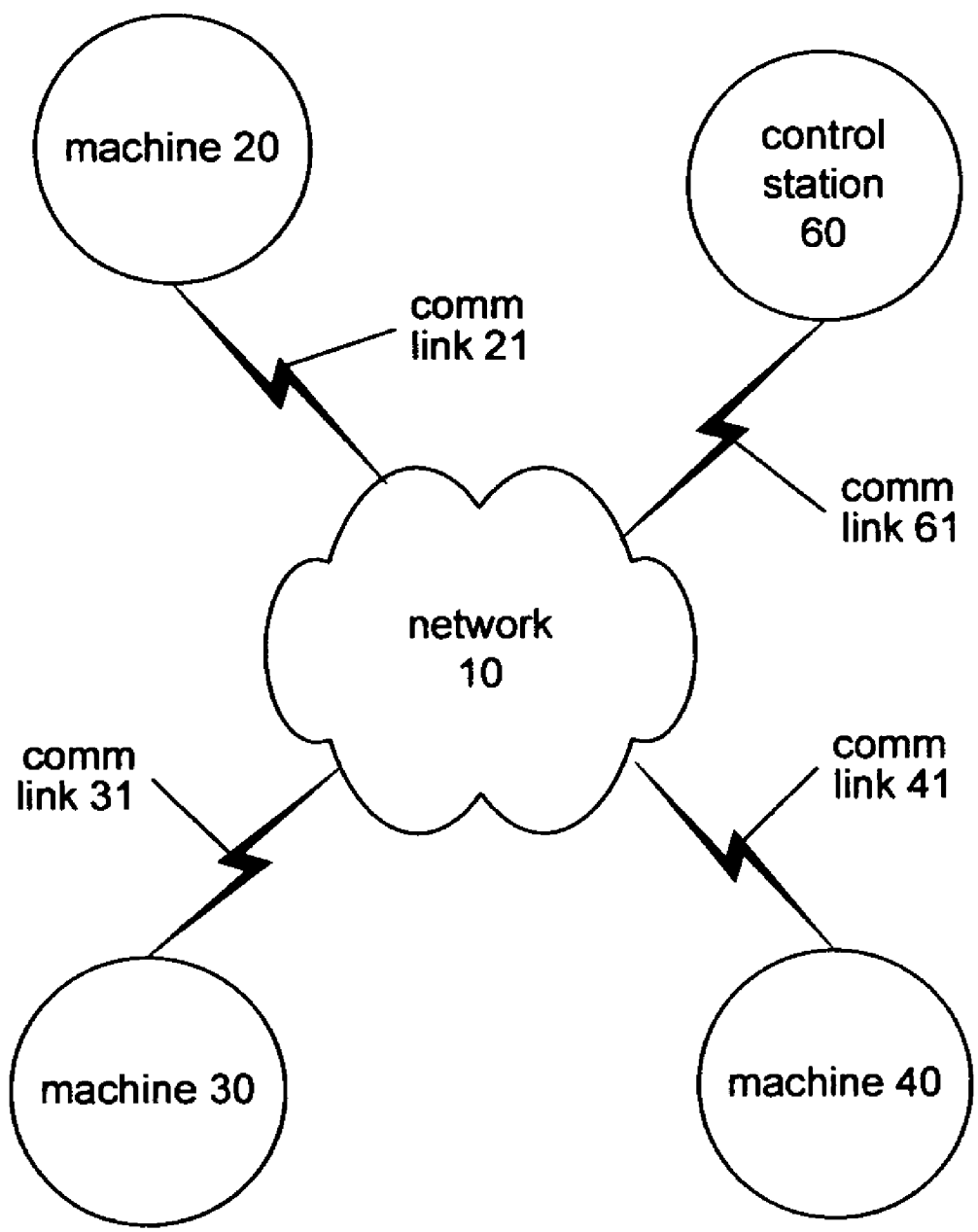
FIG. 5 is a local area network diagram illustrating an example heterogeneous self coordinated machine network including a control station according to an embodiment of the present invention.

FIG. 5 is a local area network diagram illustrating an example heterogeneous self coordinated machine network 10 including a control station 60 according to an embodiment of the present invention. In the illustrated embodiment, network 10 comprises a plurality of machines, namely machine 20, machine 30, and machine 40. In alternative embodiment, there may be more or less machines that comprise the network 10. The various machines are communicatively coupled with the network via communication link 21, communication link 31, and communication link 41, respectively. The various communication links may be implemented through a wired or wireless network medium.

The network 10 further comprises a control station 60 that is communicatively coupled with the network via communication link 61. Communication link 61 may be implemented through a wired or wireless network medium. Advantageously, control station 60 is communicatively coupled with the various machines that comprise the network 10. The function of the control station 60 preferably includes gathering information from the various machines connected with the network. Additionally, the control station 60 may also initiate actions on each individual machine that is connected to the network 10.

Figure 6:
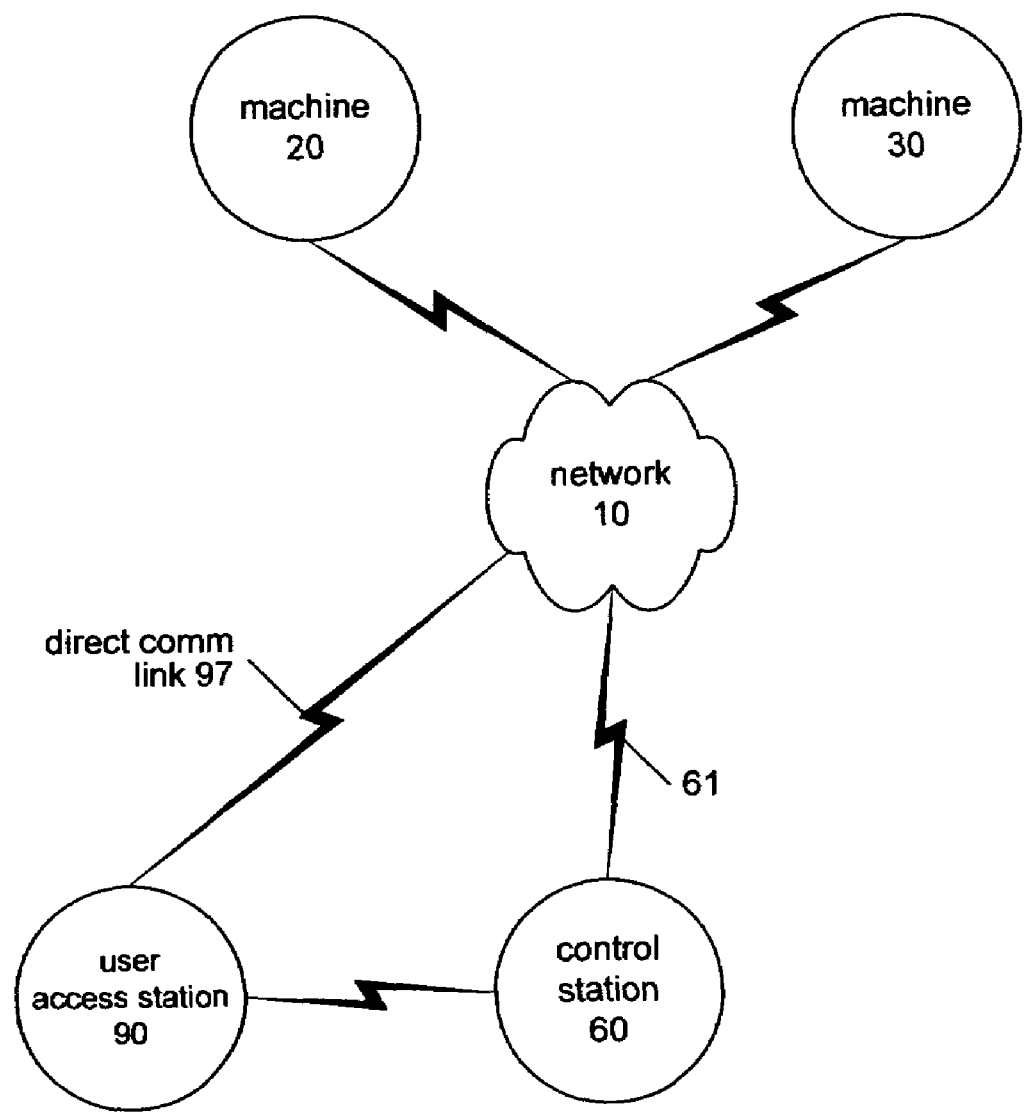
FIG. 6 is a block diagram illustrating the components of an example control station according to an embodiment of the present invention.

FIG. 6 is a local area network diagram illustrating an example heterogeneous self coordinated machine network 10 including a control station 60 and a user access station 90 according to an embodiment of the present invention. Network 10 also comprises a variable number of machines, for example machine 20 and machine 30. There may be more machines communicatively coupled with the network 10 via wired or wireless communication channels. Control station 60 is preferably configured to interact with the various machines via network 10 and cause those machines to take action or otherwise change state or provide information.

User access station 90 can be configured to provide a user interface for human or other types of users that interact with the network 10. Additional types of users may include wired or wireless communication devices that come into proximity with the user access station 90. Remote users may also interact with user access station 90 via a wide area network. Another type of user may be a software utility that executes on a portable communication device with a human operator providing instructions.

User access station 90 may communicate directly with the network 10 via communication link 97. Alternatively, user access station 90 may communicate directly with control station 60 via communication link 98. In such an embodiment, user access station 90 would communicate with the network 10 (and therefore the various machines on the network 10) indirectly. Preferably, user access station 90 is configured to provide a user with options for actions as they pertain to the various machines on the network 10.

Figure 7:
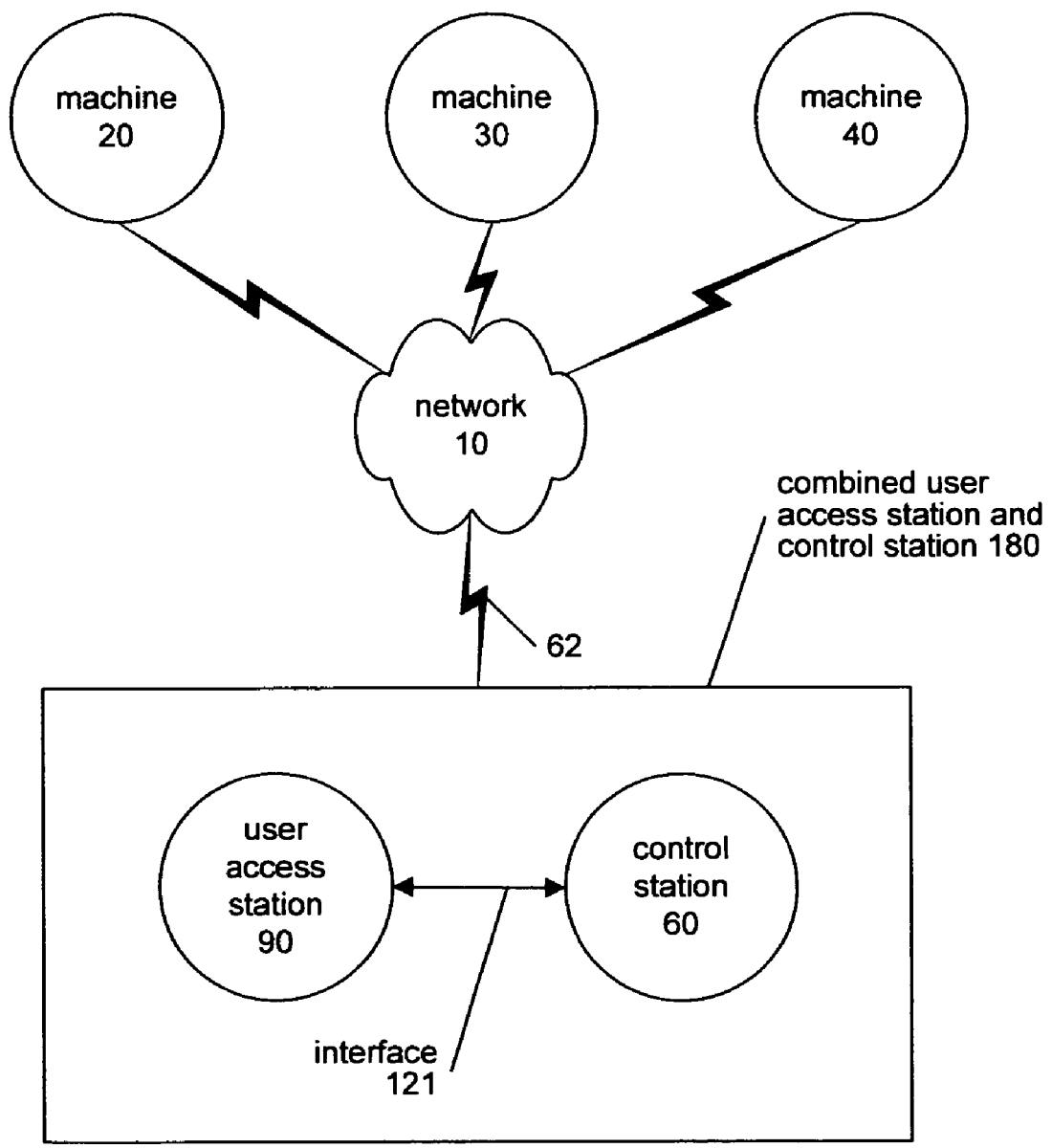
FIG. 7 is a local area network diagram illustrating an example heterogeneous self coordinated machine network including a control station and a user access station according to an embodiment of the present invention.

FIG. 7 is a local area network diagram illustrating an example heterogeneous self coordinated machine network 10 including a combined user access and control station 180 according to an embodiment of the present invention. The combined user access station 180 may advantageously be physically located in a single housing. For example, a pedestal may be provided with that allows easy access for a human user of the combined station 180.

In such an embodiment with a combined station 180, communication between the user access station 90 and the control station 60 may take place via an interface 121. The interface 121 may provide communication via a communication bus (not shown) or a wired or wireless communication link (not shown). For example, a USB, RS-232, serial, or parallel cable may connect the user access station 90 and the control station 60. In an alternative embodiment, the functionality of the user access station 90 may be implemented as a software module in the control station 60.

Figure 8:
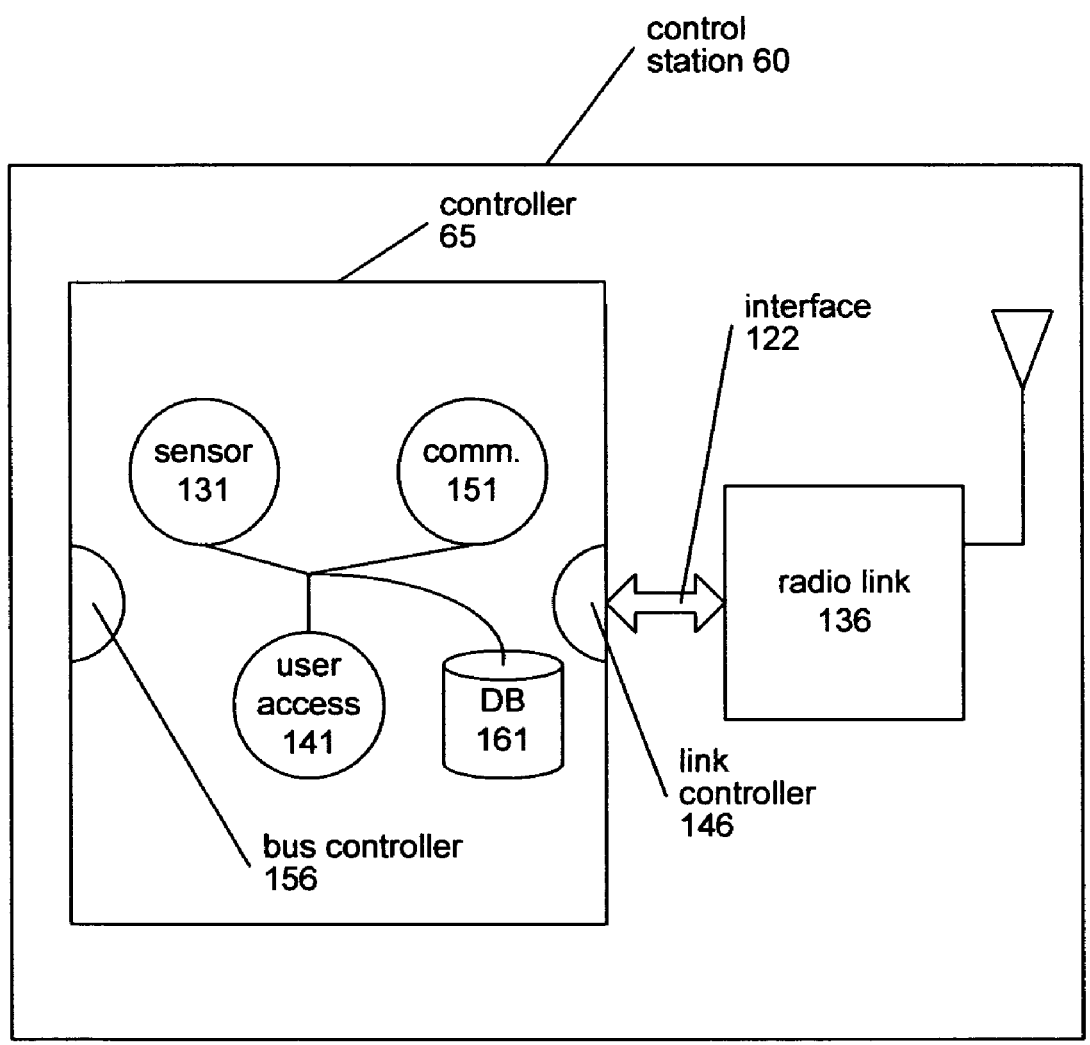
FIG. 8 is a local area network diagram illustrating an example heterogeneous self coordinated machine network including a combined user access and control station according to an embodiment of the present invention.
Figure 9:
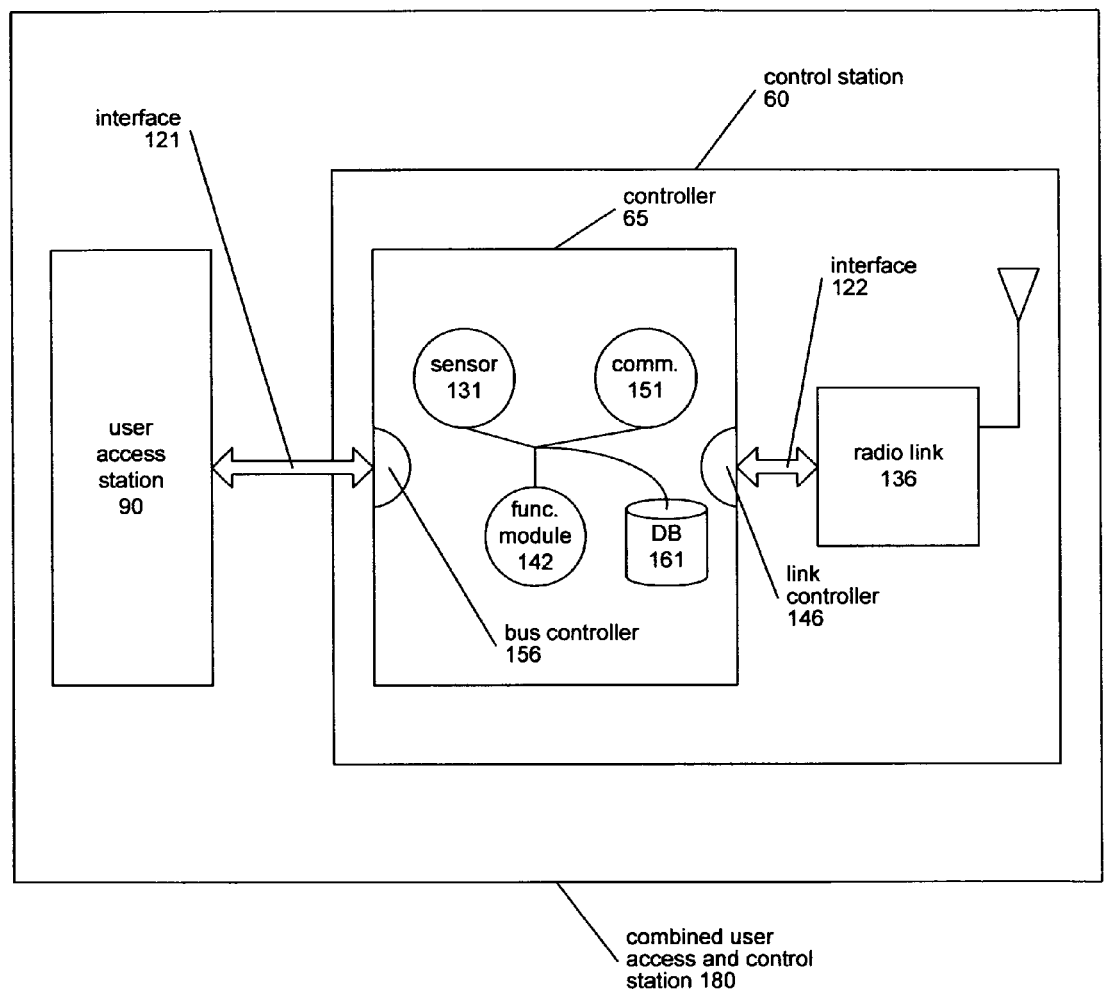
FIG. 9 is a block diagram illustrating the components of an example combined user access and control station according to an embodiment of the present invention.

FIGS. 8 and 9 are block diagrams illustrating the components of an example control station 60 and an example combined user access and control station 180 according to respective embodiments of the present invention and an example. The control station 60 is analogous to the Talker™ 110 previously described with reference to FIGS. 4A and 4B. In certain instances, the control station 60 carries out many of the same functions as the Talker™ 110. The control station 60 preferably comprises a controller 65 that is communicatively coupled with a radio link 136 through an interface 122. As previously described, the radio link 136 may be swapped out for a physical network link (not shown).

Controller 65 itself comprises a plurality of functional modules including sensor 131, user access module 141, communication module 151, and data storage area 161. Controller 65 may also comprise a link controller 146 and a bus controller 156. There may be more or fewer functional modules integral to controller 65, depending on the needs of the control station 60. Sensor 131 preferably allows the control station to sense stimuli or information from internal and external devices. For example, sensor 131 may allow the control station 60 to determine whether a desired action has taken place.

The user access module 141 is configured to interface with a user and accept input and provide feedback. In one embodiment, feedback may be provide via a graphical user interface (not shown), via audio signals, or via LEDs that are located on the control station 60. The function of user access module 141 is to provide a mechanism for a user to interact with the control station 160 and thereby also interact with the various machines that are connected to the control station 160 via the network 10. It is important to note that a user could be a human being or a software controlled device such as a remote computing device. User access module 141 is also communicatively coupled with data storage area 161.

The data storage area 161 can be implemented using on chip memory or some other type of data storage device. The function of the data storage area 161 is to house information germane to the operation of the control station 60.

Link controller 146 manages the communications with radio link 136 that take place over interface 122. The link controller 146 can preferably be configured to communicate over a variety of interfaces 122 and with a variety of radio link modules, for example a bluetooth radio link module or an 802.11 radio link module. Alternatively, the link controller 146 can also be configured to communicate over an interface 122 designed for a physical link module (not shown).

Turning now to FIG. 9, functional module 141 represents any of a variety of additional modules that can be included with controller 65. These modules can be implemented in hardware or software and preferably allows the controller 65 to carry out the mission specific tasks assigned to control station 60. For example, on implementation of functional module 141 is an actuator that allows the controller 65 to cause an internal or external device to take some sort of action or otherwise change state or provide information.

Furthermore, bus controller 156 manages the communications with any internal or external communication busses (not shown) that are communicatively coupled with controller 65. For example, an internal communication bus may provide communication with ASIC devices that are integral to the control station 60. Alternatively, an external communication bus may provide communication with an external device such as the user access station 90. In an embodiment where bus controller 155 handles communication with the user access station 90, bus controller 155 is preferably configured to communicate via an interface 120 that is particularly adapted to the user access station 90.

User access station 90 can preferably be configured to provide a user interface for the variety of types of users (human and/or software controlled device) that interact with the network 10. User access station 90 is preferably configured to allow access to both local and remote users. User access station 90 can be configured to require authentication of users, either in a very rigid and secure fashion or in a more relaxed fashion. User access station 90 communicates with the network 10 via the control station 60. For example, communications from user access station 90 that are destined for network 10 may be handled by communication module 151 and sent to network 10 via the radio link 136.

Figure 10:
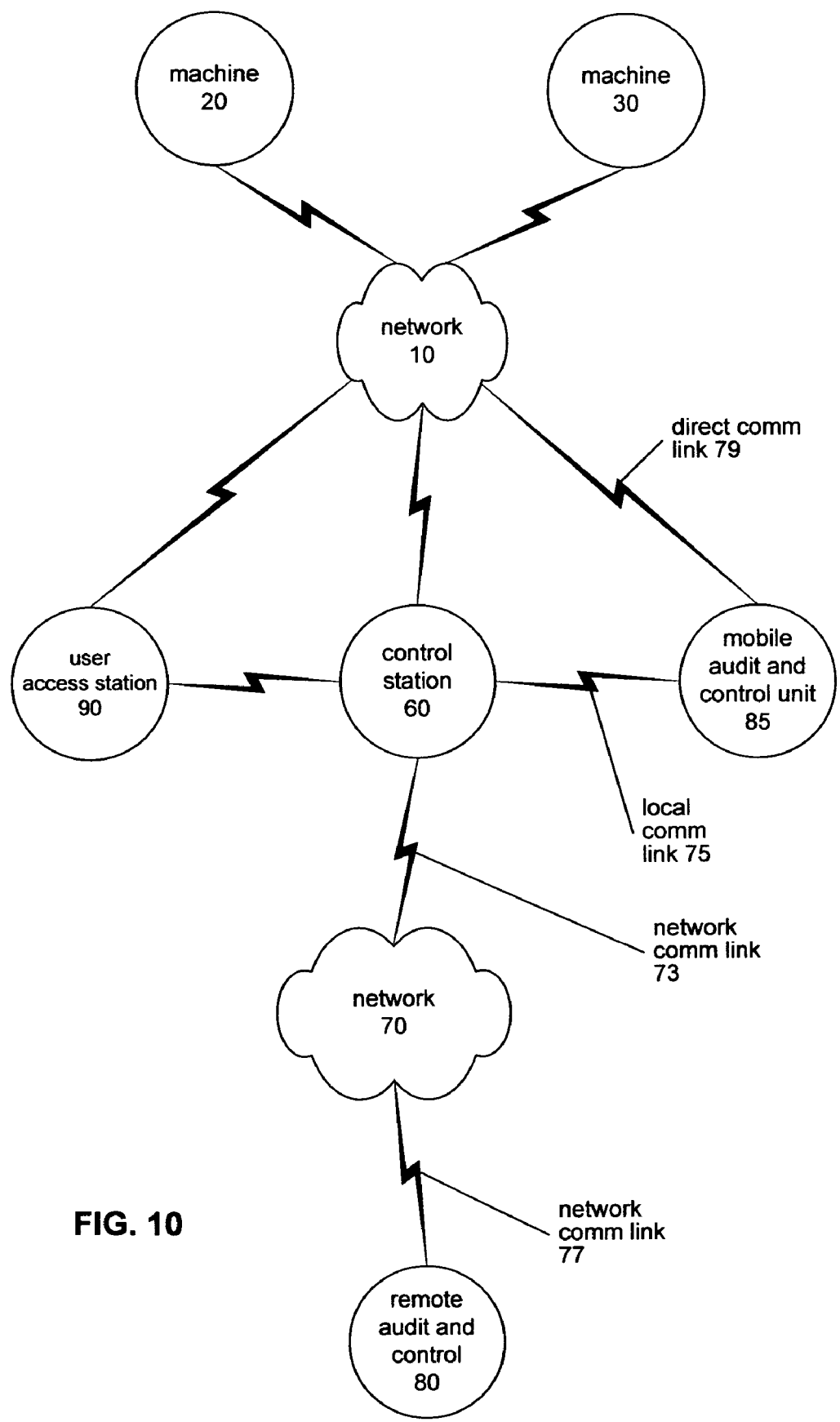
FIG. 10 is a wide area network diagram illustrating an example heterogeneous self coordinated network communicatively coupled with an external network and a remote audit and control station according to an embodiment of the present invention.

FIG. 10 is a wide area network diagram illustrating an example heterogeneous self coordinated network 10 communicatively coupled with an external network 70 and a remote audit and control station 80 according to an embodiment of the present invention. Network 10 comprises a plurality of machines communicatively coupled over wired or wireless communication channels. In the illustrated embodiment, machine 20 and machine 30 are part of network 10. Additionally connected to network 10 are user access station 90 and control station 60. As previously described with respect to FIGS. 7 and 9, the user access station 90 and the control station 60 may by integrated into a combined station 180.

In addition to being connected with network 10, control station 60 (or combined station 180) is advantageously also communicatively coupled with network 70 via a communication link 73. Communication link 73 can be implemented as a wired or wireless link. Furthermore, network 70 can be a local area network, a wide area network, or a combination of networks such as the ubiquitous Internet. Advantageously, network 70 communicatively couples control station 60 with remote audit and control station 80, which is connected to network 70 via communication link 77, which may be implemented as a wired or wireless link.

Mobile audit and control station 85 can be connected to network 10 either through a direct communication link 97 or through control station 60 via communication link 75. In either case, the function of mobile audit and control station 85 is to collect information from the various machines connected to network 10. Mobile audit and control station 85 may also initiate actions on the various machines connected to network 10. For example, mobile audit and control station 85 may cause the various machines to take an inventory of product or an inventory of their constituent parts.

Remote audit and control station 80 can advantageously be configured to perform the same function as the mobile audit and control station 85. Preferably, the remote audit and control station 80 can communicate with a plurality of networks such as network 10. Moreover, the remote audit and control station 80 can contain certain management functions that control the actions of the various machines connected to network 10.

Figure 11:
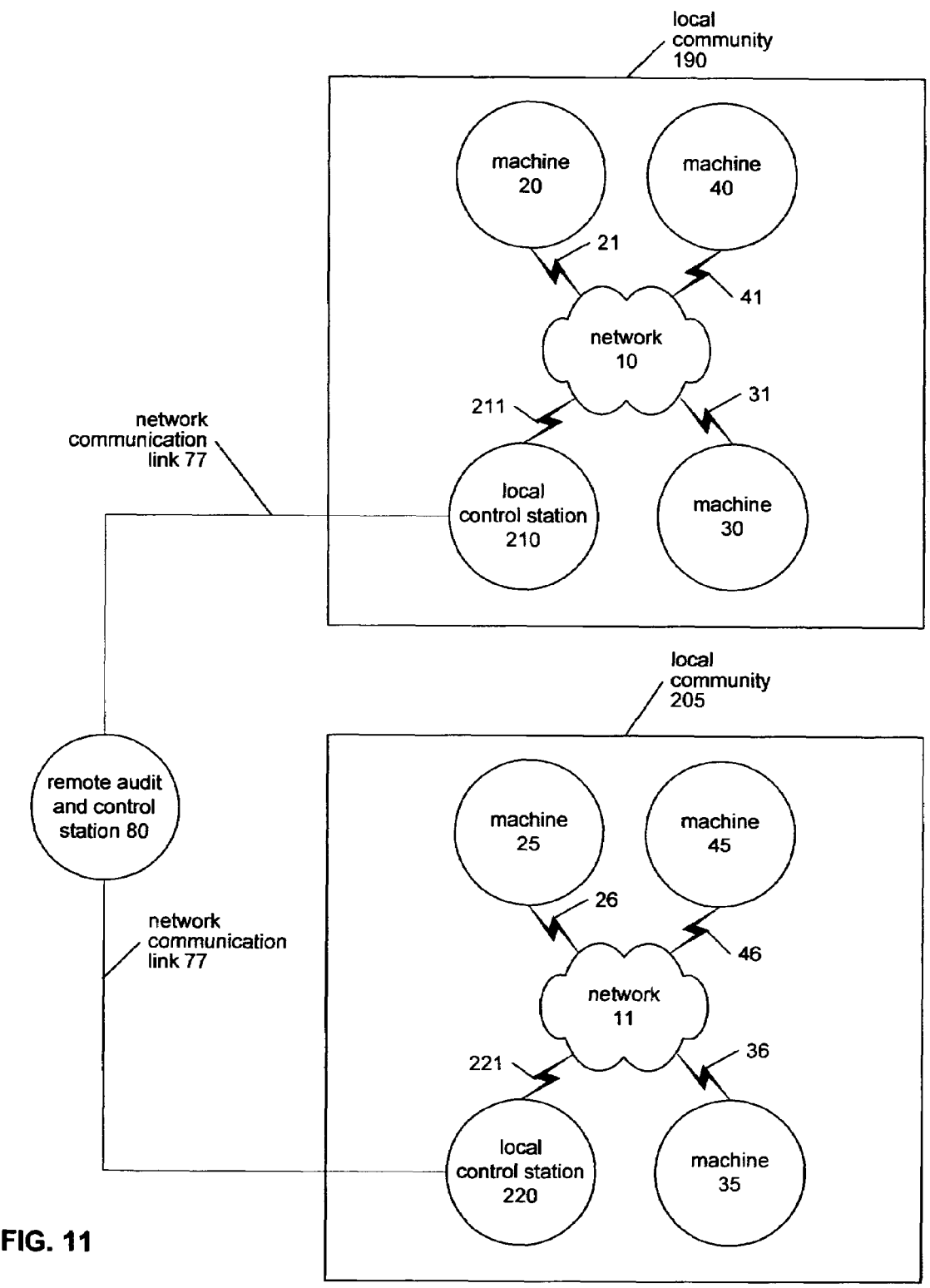
FIG. 11 is a wide area network diagram illustrating an example of two local self coordinated networks communicatively coupled with a remote audit and control station according to an embodiment of the present invention.

FIG. 11 is a wide area network diagram illustrating an example of two local self coordinated networks 190 and 205 communicatively coupled with a remote audit and control station 80 according to an embodiment of the present invention. In the illustrated embodiment, a single remote audit and control station 80 is communicatively coupled with two separate self coordinated networks, namely network 10 and network 11. Each of the separate self coordinated networks is designated as a local community, namely community 190 and community 205, respectively.

Remote audit and control station 80 is communicatively coupled with the separate networks 10 and 11 through communication link 77. There may be intervening networks (not shown) between the remote audit and control station 80 and the local networks 10 and 11. Within each local network, the remote audit and control station 80 is in communication with a local control station. For example, in local community 190, the remote audit and control station 80 is communicatively coupled with local control station 210. Of course, local control station 210 may be implemented as a combined user access and control station.

Similarly, in local community 205, the remote audit and control station 80 is communicatively coupled with local control station 220, which can also be implemented as a combined user access and control station. Internal to the local community 205, network 11 communicatively couples various machines, namely machine 25, machine 35, and machine 45, each through its respective communication link 26, 36, and 46. In local community 190, machine 20, machine 30, and machine 40 are connected to the network 10, each through its respective communication link 21, 31, and 41. Local control station 210 is also connected to network 10 via communication link 211. Similarly, local control station 220 is connected to network 11 via communication link 221.

One particular advantage of the illustrated embodiment is that a single remote audit and control station 80 is configurable to manage a plurality of local communities of machines (e.g. self coordinated networks) from a remote location. This remote management capability presents significant advantages by way of streamlining redundant infrastructure.

Figure 12:
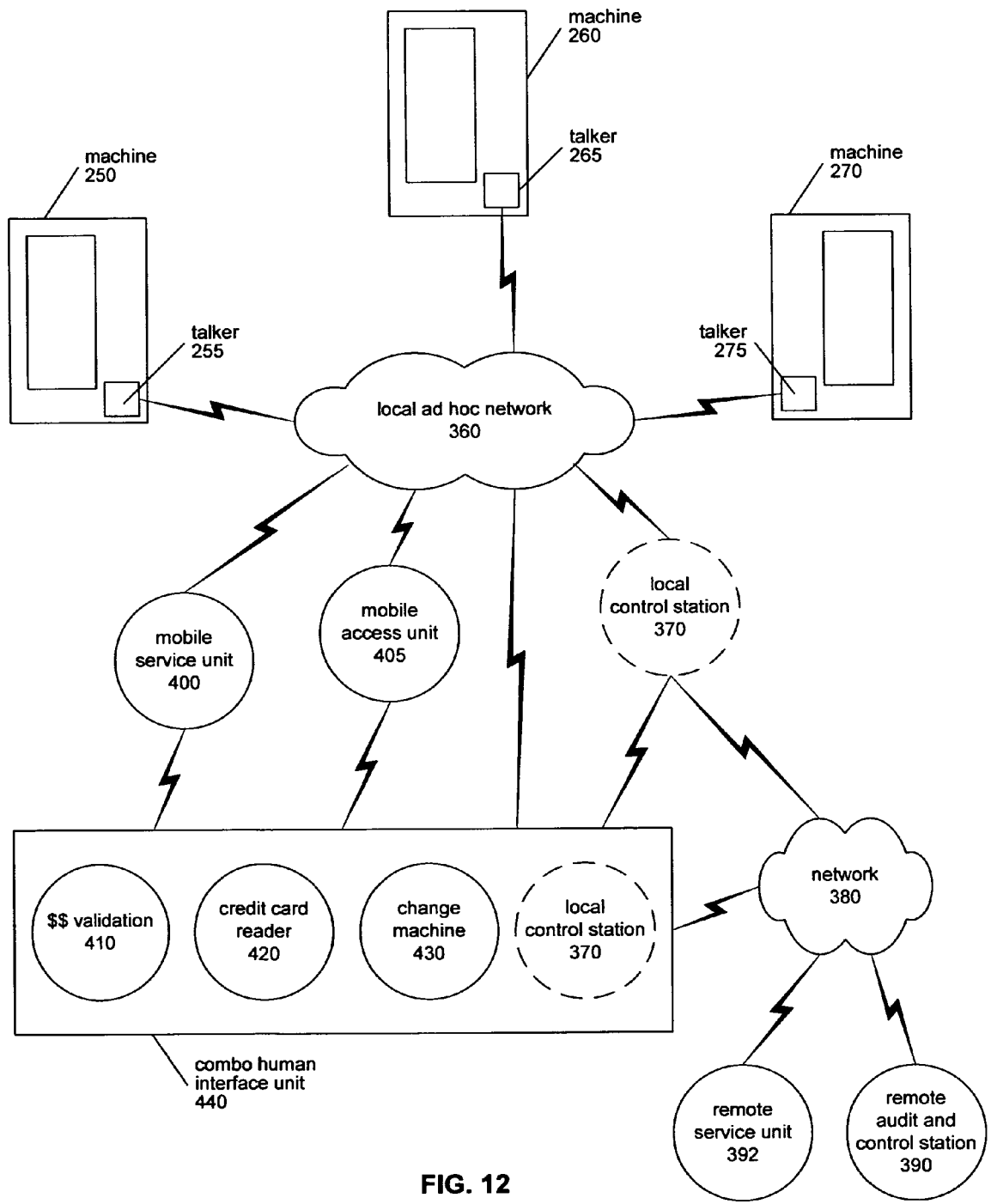
FIG. 12 is a local area network diagram illustrating an example system implementing a self coordinated network according to an embodiment of the present invention.

FIG. 12 is a local area network diagram illustrating an example system implementing a self coordinated wireless network 360 according to a vending machine embodiment of the present invention. In the illustrated embodiment, network 360 communicatively couples a plurality of machines, namely machine 250, machine 260, and machine 270. Each of the various machines is configured with a Talker™ device, namely Talker™ 255, Talker™ 265, and Talker™ 275, respectively. Each Talker™ device is communicatively coupled with the network 360 and its respective machine. Moreover, each Talker™ device is capable of gathering information from its own machine in addition to causing its own machine to take an action.

The various machines 250, 260, and 270 communicate with each other via network 360 and continuously pass information back and forth to each other. Examples of this information include inventory details, machine status information, and user interaction information. Advantageously, each respective Talker™ device is equipped with a data storage area and the Talker™ devices maintain status information therein. For example each of the vending machines in the self coordinated network 360 contains a list of the other machines in the network 360. Additionally, each machine also contains an inventory associated with each other machine in the network.

Also connected to the network 360 are mobile service unit 400, mobile access unit 405, and optionally a local control station 370. Rather than being implemented in a separate device, the local control station 370 may be combined with a user access station in a combination human interface unit 440, which is also connected to the network 360. The combination interface unit 440 preferably includes a currency validation module 410, a credit card reader 420, and a currency exchange module 430.

The function of the various modules is self-evident for the most part, with the currency validation module 410 confirming that the user has provided legal tender, the credit card reader module 420 confirming that a valid credit card has been provided, and the currency exchange module 430 providing change to a user, either the balance of the transaction or an exchange, for example 4 quarters for a dollar bill.

Devices such as the mobile service unit 400 and the mobile access unit 405 may communicate directly with network 360 or indirectly through the combination interface unit 440. In one embodiment, the mobile service unit 400 can be implemented as a personal digital assistant, a palm computer, a laptop computer, a digital cell phone, or a 10-key device. Other alternative devices may also be employed. Desirable characteristics of the unit 400 include the ability to communicate with network 10, either directly or through the combination interface unit 440. Additionally, unit 400 is preferably capable of emergency or scheduled maintenance of the machines connected to network 360.

Similarly, mobile access unit 405 can be implemented in a variety of communication devices. In the illustrated embodiment, those devices include a wireless communication capability. Additionally, mobile access unit 405 may merely be a platform for a software module that allows the unit 405 to communicate with the network 360 or the combination interface unit 440.

Also connected to the network 360 via a remote network 380 is a remote audit and control station 390 and a remote service unit 392. Advantageously, the remote audit and control station 390 can interact with the various machines on the network 360 through the local control station 370, either in a stand alone embodiment or as an integrated component of the combination interface device 440. Furthermore, remote service unit 392 is also preferably configured to communicate with the various machines through the same communication path.

Figure 13:
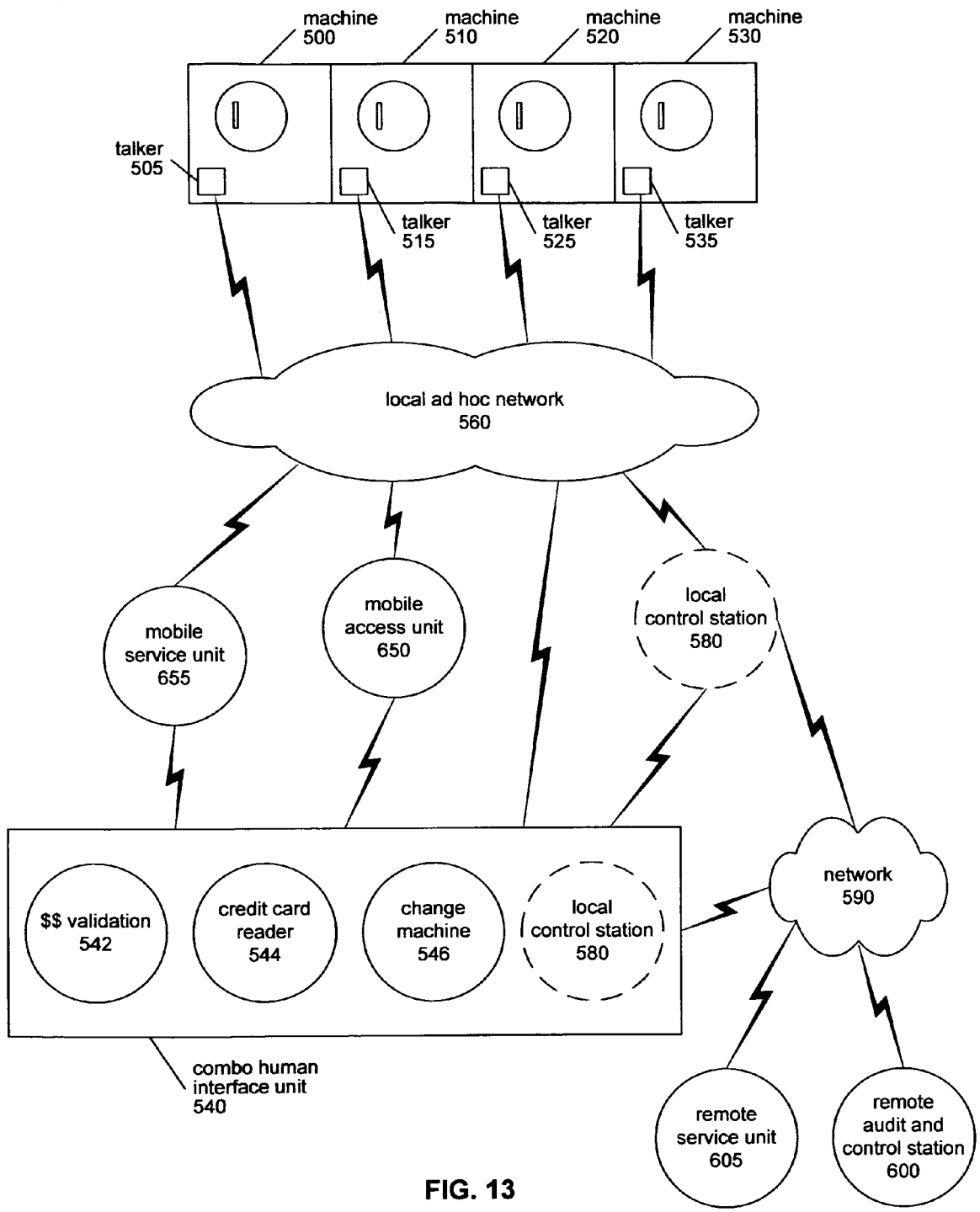
FIG. 13 is a local area network diagram illustrating another example system implementing a self coordinated network according to an embodiment of the present invention.

FIG. 13 is a local area network diagram illustrating another example system implementing a self coordinated network 560 according to an embodiment of the present invention. In the illustrated embodiment, network 560 communicatively couples a plurality of machines, namely machine 550, machine 510, machine 520, and machine 530. Each of the various machines is configured with a Talker™ device, namely Talker™ 505, Talker™ 515, Talker™ 525, and Talker™ 535, respectively. Each Talker™ device is communicatively coupled with the network 560 and its respective machine. Moreover, each Talker™ device is capable of gathering information from its own machine in addition to causing its own machine to take an action.

The various machines 500, 510, 520, and 530 communicate with each other via network 560 and continuously pass information back and forth to each other. Examples of this information can include machine status information (e.g., in use/not in use) and network centric information (e.g., 5 washing machines available). Advantageously, each respective Talker™ device is equipped with a data storage area and the Talker™ devices maintain status information therein. For example each of the laundry machines in the self coordinated network 560 preferably contains a list of the other machines in the network 560 and those respective machines individual status information.

Also connected to the network 560 are mobile service unit 655, mobile access unit 650, and optionally a local control station 580. Rather than being implemented in a separate device, the local control station 580 may be combined with a user access station in a combination human interface unit 540, which is also connected to the network 560. The combination interface unit 540 preferably includes a currency validation module 542, a credit card reader 544, and a currency exchange module 546, in addition to the optionally integral local control station 580.

The function of the various modules includes the currency validation module 542 confirming that the user has provided legal tender, the credit card reader module 544 confirming that a valid credit card has been provided, and the currency exchange module 546 providing change to a user, either the balance of the transaction or an exchange, for example 4 quarters for a dollar bill.

Devices such as the mobile service unit 655 and the mobile access unit 650 may communicate directly with network 560 or indirectly through the combination interface unit 540. In one embodiment, the mobile service unit 655 can be implemented as a personal digital assistant, a palm computer, a laptop computer, a digital cell phone, or a 10-key device. Other alternative devices may also be employed. Desirable characteristics of the mobile service unit 655 include the ability to communicate with network 10, either directly or through the combination interface unit 540. Additionally, mobile service unit 655 is preferably capable of emergency or scheduled maintenance of the machines connected to network 560.

Similarly, mobile access unit 650 can be implemented in a variety of communication devices. In the illustrated embodiment, those devices include a wireless communication capability. Additionally, mobile access unit 650 may merely be a platform for a software module that allows the mobile access unit 650 to communicate with the network 560 or the combination interface unit 540.

Also connected to the network 560 via a remote network 590 is a remote audit and control station 600 and a remote service unit 605. Advantageously, the remote audit and control station 600 can interact with the various machines on the network 560 through the local control station 580, either in a stand alone embodiment or as an integrated component of the combination interface device 540. Furthermore, remote service unit 605 is also preferably configured to communicate with the various machines through the same communication path.

FIG. 14 is a block diagram illustrating an example memory segment 610 allocated for storing software subroutines according to an embodiment of the present invention. In the illustrated embodiment, the memory segment comprises an area for host interaction software 615, an area for community interaction software 620, an area for remote interaction software 625, an area for internal control software 630, and an area for special subroutines 635.

The area for host interaction software 615 preferably stores a plurality of subroutines that are executable by a processor and that carry out host specific tasks. For example, a first subroutine may query the host for information and a second subroutine may cause the host to take an action. A plurality of subroutines can be maintained in the area for host interaction software 615, as illustrated.

The area for community interaction software 620 preferably stores a plurality of subroutines that are executable by a processor and that carry out specific tasks with respect to the community of machines. Additionally, the area for community interaction software 620 may include common subroutines that work for any machine in the community and may also include machine specific subroutines that work for a particular machine type or a particular individual machine. A plurality of common and machine specific subroutines can be maintained in the area for community interaction software 620, as illustrated.

The area for remote interaction software 625 preferably stores a plurality of subroutines that are executable by a processor and that carry out specific tasks with respect to a remote station. For example, the various subroutines may be executed in response to different queries or commands from the remote station. A plurality of subroutines can be maintained in the area for remote interaction software 625, as illustrated.

The area for internal control software 630 preferably stores a plurality of subroutines that are executable by a processor and that carry out specific tasks with respect to internal control for the Talker™. For example, a first subroutine may cause the Talker™ to reset or take some other action such as querying the network for information. A plurality of subroutines can be maintained in the area for internal control software 630, as illustrated.

The area for special subroutines 635 preferably stores a plurality of subroutines that are executable by a processor and that carry out host specific tasks. The various special subroutines can be machine specific, host specific, remote station specific or otherwise dedicated to a particular function or generalized for common use. A plurality of subroutines can be maintained in the area for the special subroutines 635, as illustrated.

FIG. 15 is a block diagram illustrating an example memory segment 640 allocated for storing machine specific interaction programs according to an embodiment of the present invention. In the illustrated embodiment, the memory segment comprises an area for machine A interaction 645, an area for machine B interaction 650, an area for machine C interaction 655, and on up through an area for machine X interaction 650.

There can be any number of memory areas, each representing one of a plurality of machines. In this particular example, the letter X does not limit the list to 24 entries but rather stands for an unknown last memory area in a set that can range from a few memory areas up to the highest number of allowable memory areas with respect to the available physical memory and data storage areas. Advantageously, in each of the memory areas for the particular machines, a plurality of unique programs may be stored that are optimized for the particular machine.

FIG. 16 is a block diagram illustrating an example memory segment 670 allocated for storing standard machine characteristics according to an embodiment of the present invention. In the illustrated embodiment, the memory segment 670 comprises an area for host personality 675, an area for machine A personality 680, an area for machine B personality 685, and on up through an area for machine X personality 690.

As previously described, there can be any number of memory areas within memory segment 670, each representing one of a plurality of machines including the host machine and other machines. Once again, in this particular example, the letter X does not limit the list to 24 entries but rather stands for an unknown last memory area in a set that can range from a few memory areas up to the limit imposed by the available physical memory and data storage areas. Advantageously, in each of the memory areas for the particular machines, a plurality of standard features specific to a particular machine may be stored.

FIG. 17 is a block diagram illustrating an example memory segment 700 allocated for storing unique machine characteristics according to an embodiment of the present invention. In the illustrated embodiment, the memory segment 700 comprises an area for host custom 705, an area for machine A custom 710, an area for machine B custom 715, and on up through an area for machine X custom 720.

As previously described, there can be any number of memory areas within memory segment 700, each representing one of a plurality of machines including the host machine and other machines. Once again, in this particular example, the letter X does not limit the list to 24 entries but rather stands for an unknown last memory area in a set that can range from a few memory areas up to the limit imposed by the available physical memory and data storage areas. Advantageously, in each of the memory areas for the particular machines, a plurality of unique features specific to a particular machine may be stored.

In a general sense, the processes that run on a MachineTalker™ function in concert to allow a newly powered up MachineTalker™ to build a local knowledge base about the Talker's™ host and the Talker's™ environment and possibly provide a status report to a remote station. The power up process runs whether or not a MachineTalker™ is installed in a particular host machine. The power up process also runs when a MachineTalker™ is brought into proximity with a community of machines.

The power up process allows the MachineTalker™ to builds its local knowledge base about its host and its local community of machines. In this fashion, the MachineTalker™ takes on the character of its host and represents the host to the local community and the remote outside world, providing external control of the host and acting as a proxy for the host in all dealings.

Once the MachineTalker™ has established its local knowledge base and determined its possible actions and interactions, the MachineTalker™ establishes a ready state for its host machine and continuously monitors for interrupts. For example, interrupts may be received from at least four sources, namely (1) the local host machine; (2) the community of machines; (3) a remote station; and (4) the MachineTalker™ itself (e.g. an internal time-out interrupts). In one embodiment, an internal time-out interrupt may be a periodic notice to query the host in order to update the host database and determine if a change in state has occurred. Thus, the MachineTalker™ in each host is advantageously aware of the state of the host machine and can therefore make decisions for the host machine.

It is also important to note that each Talker™ may comprise a microprocessor, a non-volatile memory (containing at least the simple machine management protocol ("SMMP™") software and other software subroutines), a random access memory ("RAM") where information like host and community profiles can be stored, and a communication means.

In one embodiment, a Talker™ is provided with SMMP™ software in addition to certain pre-defined start-up programs that are stored in executable memory space. The start-up programs advantageously perform the basic processes of building the personality of a given Talker™. The personality of a Talker™ is defined as the Talker's™ set of functional abilities. A new or basic Talker™ has the potential to take on any number of different functional abilities, and therefore may assume a variety of personalities. Because the functional abilities are programmable, the number of personality variations is virtually limitless.

Thus, a Talker™ may have been pre-programmed with those tools (i.e., sub-routines or software programs) it needs to perform its assigned application. Alternatively, a Talker™ may need to be initialized and thereby provided with its personality. This can be done through a connection to a local or remote control station. A Talker™ may also be initialized by an adjacent Talker™ within its community through the Talker's™ communication means. Preferably, each Talker™ is not only capable of being programmed for a specific task, but is also capable of storing its personality in non-volatile memory so that once established, the Talker™ remembers its personality even after being powered off.

In one embodiment, the communication means may include an external network port (wired or wireless) and a local host connector, for example a universal serial bus ("USB") connector or an RS-232 connector. In addition to these elements, a Talker™ may also include both a self powering means such as a lithium battery or a solar converter. A Talker™ may also be outfitted with a global positioning system ("GPS") unit for a number of alternative applications.

Furthermore, a Talker™ may operate in a variety of modes. For example, a Talker™ may operate in a stand alone mode when there is no host machine. In such an embodiment, the Talker™ operates independently and therefore contains executable subroutines and data that cam be used to manage and facilitate its own community of subordinate Talkers™.

For example, a Talker™ may be employed for management of an assembly process. Preferably, the assembly management Talker™ contains a copy of the bill of materials and the manufacturing instructions for the product being manufactured. Advantageously, the Talker™ may be attached to the base unit or frame of the product being assembled from where the Talker™ provides the name of the next component to be installed to the installation crew (human or computer). Furthermore, the Talker™ may interrogate a subordinate Talker™ that is attached to the newly installed component to make sure that the correct component has been installed.

The processes that are contained in a basic Talker™ unit and that are initiated by the powering up are those that will build the Talker™ profile, the host profile, and the community profile, which contains profiles for all of the machines within the local community of machines. Once the profiles have been established, the initialization process establishes a communication link with a control station, either a remote control station, a local control station, or both. Advantageously, once the communication link with a control station has been established, the Talker™ may provide status information pertaining to the condition of the local host and the community.

For applications where MachineTalkers™ communicate with intelligent hosts, each other, and remote stations, SMMP™ supports HTTP, XML and JAVA to provide developers with a standard application programmer's interface. This open environment facilitates rapid and inexpensive integration and lowers the cost and risk of adoption. An embedded XML web agent can also increase portability and ease of access by offering common browser-based technology and enabling the use of industry standard software.

Each new Talker™ unit can be pre-programmed for an intended application. When powered up, the Talker™ preferably announces itself to its host and network community.

Even when not programmed for a specific application, a standard Talker™ advantageously possesses all of the necessary attributes to be trained by the other machines in the community. The standard Talker™ also comes with its native Talk/Listen/Load language (i.e., SMMP™) and with its memory already organized into segments in which to store the profiles of its host and its network community.

The mix of characteristics and capabilities that result from this configuration permit the MachineTalkers™ to self-configure themselves into ad hoc, integrated networks that can expand and contract seamlessly and without interruption as additional MachineTalker™ modules are powered up or brought into proximity. The overall network integrity is not affected by newcomers or recently departed MachineTalkers™.

At the same time this community of MachineTalkers™ is highly integrated, in the sense that its members know, and continuously update themselves about the presence and meaningful characteristics of all the other members of the networked community.

This ability to organize into into a self-aware network is readily accomplished because the MachineTalker™ modules are programmed to broadcast their presence, status and the information they possess to the community. Each Talker™ also receives the same type of information from other members of the community. The result is that every Talker™ module (and therefore each machine or component it controls) is sensitive to its own condition as well as the condition and needs of its peers.

The combination of these qualities results in highly distributed, fault tolerant and flexible intelligence that manifests itself by the ability of the distributed modules to possess knowledge and decision making capabilities. All these qualities are due to both the capability of the modules themselves and to the management, discipline and coordination brought about by the SMMP™.

Advantageously, the MachineTalker™ becomes part of the host machine and is therefore a locally attached processing device that will continuously gather and store information for use in local decision-making. Even older machines that are more mechanical in nature will have much the same intelligence as all other machines using MachineTalkers™. In this case there may be less information to gather, but that which is gathered will be resident in the local MachineTalker™ device.

For those applications where little information is to be provided about a host machine or where there is no host, a scaled down MicroTalker™ version is provided. The MicroTalker™ also has the ability to converse with other MachineTalkers™ in order to pass on identification and other information. These MicroTalkers™ are packaged in a variety of ways like the flexible form of a glue-on strip used for inventory stickers now on the market. Alternatively, a MicroTalker™ can be affixed to a wall, integrated with a traveling container on a production line, or encapsulated for immersion. Additionally, the MachineTalkers™ are able to communicate using various communication protocols such as TCP/IP, SMMP™, automatic network configuration ("ANC") protocol, and combinations such as SMMP™/IP, ANCT based SMMP™, and XML based SMMP™.

Figure 18:
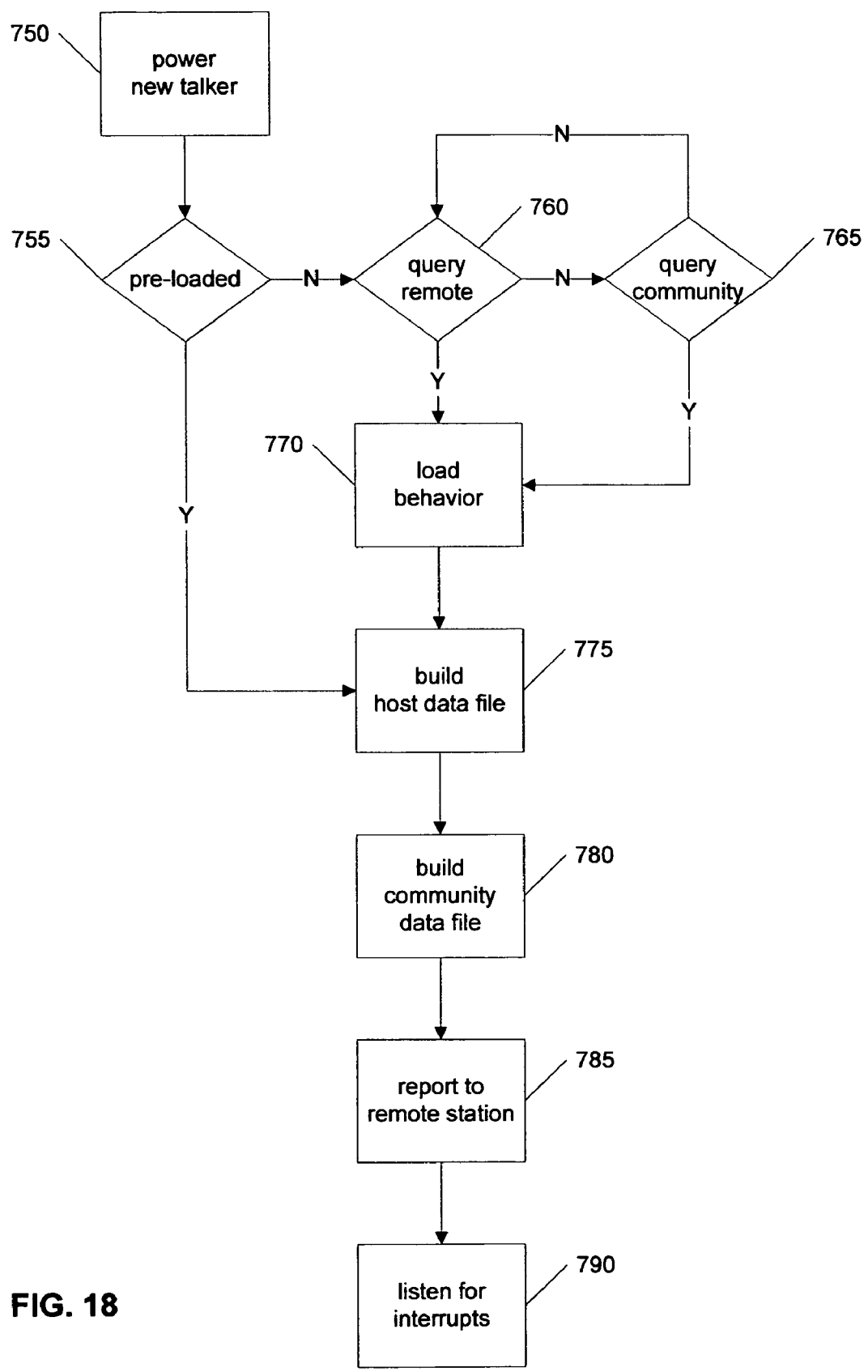
FIG. 18 is a flow diagram illustrating an example process for initializing a new Talker™ according to an embodiment of the present invention.

FIG. 18 is a flow diagram illustrating an example process for initializing a new MachineTalker™ according to an embodiment of the present invention. Initially, in step 750, the Talker™ is powered on. As previously described, a Talker™ may be pre-configured with a personality or it may be a blank slate. In step 755, the Talker™ checks to see if it has been pre-configured. This can be accomplished, for example, by consulting a particular location in memory to see if any subroutines or software programs have been loaded. If the Talker™ is not pre-configured, the Talker™ next queries a remote control station to determine its configuration, as illustrated in step 760.

If no remote control station responds or if the Talker's™ configuration is unobtainable from the remote control station, then the Talker™ proceeds to query its local community, as shown in step 765. The community query can take place over a wired or wireless network and can be implemented as a broadcast message sent over the network. If no machines in the local community respond, or if there is no local community available the Talker™ cycles through steps 760 and 765 in an attempt to initialize.

When a remote control station or a machine in the local community does respond, the Talker™ downloads and instantiates its behavioral qualities, as shown in step 770. As previously described, the behavioral qualities of a Talker™ are its set of executable sub-routines and software programs that define the Talker's™ functional capabilities.

Once the behavior has been loaded, or in the case where the Talker™ is pre-configured, the Talker™ next builds its host data file, as illustrated in step 775. The building of the host data file includes querying the local host machine and storing information about the host in a persistent data storage area Next, the Talker™ builds its community data file, as shown in step 780. The community data file comprises information concerning each machine that is present in the local community. Advantageously, this allows the various machines in the community to redundantly store status information pertaining to the entire community. The building of the community data file can include querying the community to determine what machines belong to the community and then querying each individual machine to determine the status and other information relevant to the particular machine.

After the Talker™ has established its personality and built the host and community data file, the Talker™ next contacts the remote station, if available, and provides information concerning the Talker's™ host and community, as shown in step 785. Once the Talker™ has reported in to the remote control station, the Talker™ then enters a passive mode, as illustrated in step 790, where it listens for interrupts.

Figure 19:
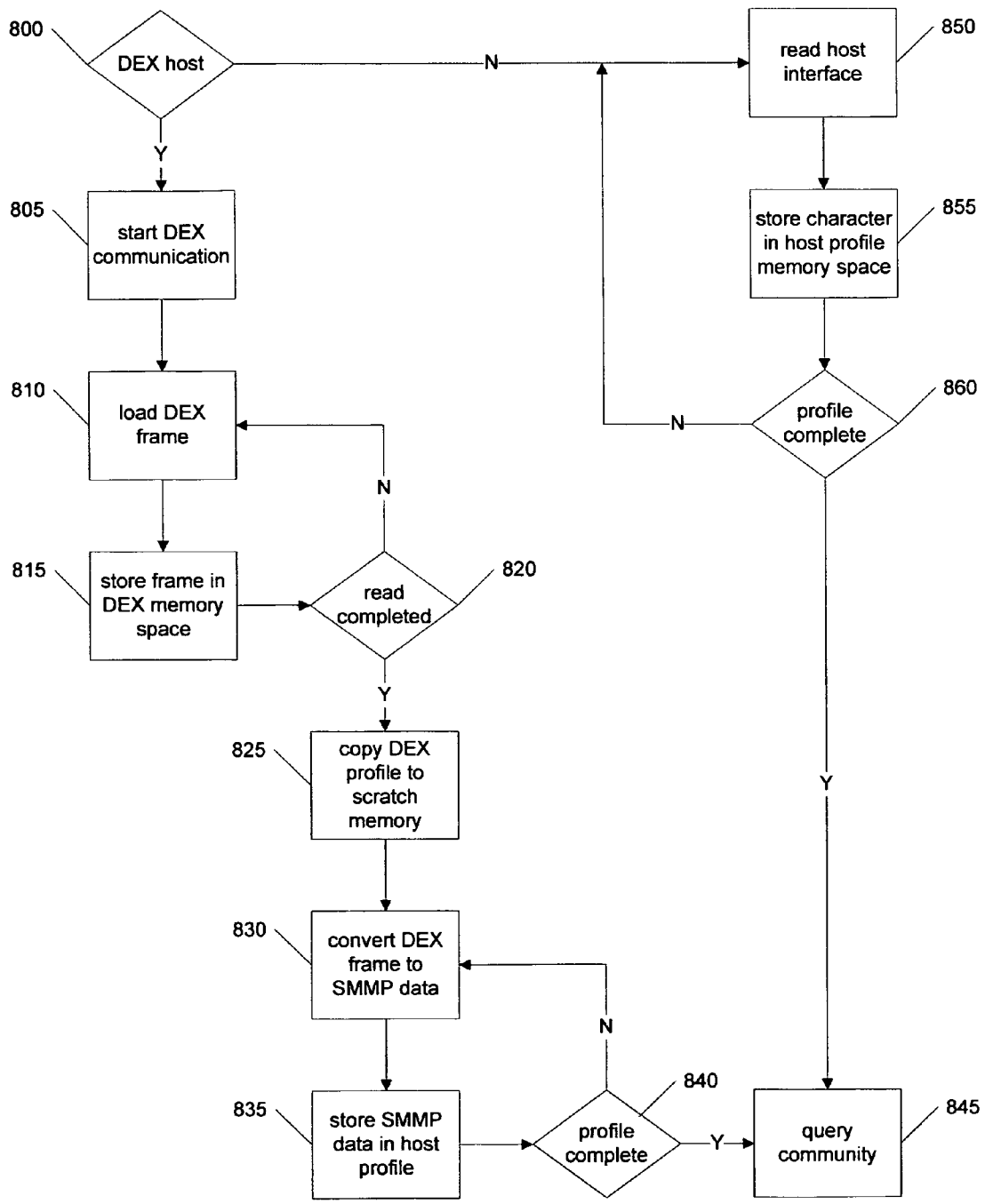
FIG. 19 is a flow diagram illustrating an example process for building a host profile according to an embodiment of the present invention.

FIG. 19 is a flow diagram illustrating an example process for building a host profile according to an embodiment of the present invention. Initially, in step 800 the Talker™ determines if the host machine is capable of communicating in any well known data exchange ("DEX") format. Examples of DEX formats can include proprietary communication protocols as well as published and widely disseminated communication protocols. For example, in an embodiment where the host machine is a vending machine, the machine may communicate using the well known vending machine communication standard. Other machines, for example currency exchange machines, may also communicate using a standardized DEX format, although for security reasons the format may be proprietary. Advantageously, the Talker™ may be configured to query a host machine with a variety of different types of communication standards until the particular language of the machine (i.e., the DEX format) is determined.

If the host machine is capable of communicating in a DEX format with the Talker™, the Talker™ transitions into DEX communication mode, as illustrated in step 805. The DEX mode may employ any of the various communication standards known by the Talker™, and the Talker™ may be pre-configured to use any of the various public and proprietary DEX formats. Additionally, the DEX mode may communicate over a wired or wireless communication link with the host machine, for example using bluetooth, USB, or RS-232.

Once in DEX mode, the Talker™ begins communication by loading a DEX frame from the host machine, as shown in step 810. Next, in step 815, the Talker™ stores the frame in memory for later use. If the read is completed, as determined in step 820, the Talker™ then copies the frame into scratch memory in step 825. The read is not completed until the entire host profile has been read, frame by frame. If the read is not yet completed, the Talker™ loops back in the process and loads another frame, as previously described with respect to step 810.

When the read is complete and the frame containing the entire DEX host profile has been copied into scratch memory, the Talker™ then begins with the first DEX frame and begins to update the stored host profile. If this is the first load of the host profile, then the process is initializing the host profile in memory. Thus, in step 830 the Talker™ converts the first DEX frame to SMMP™ data and then stores the SMMP™ data in the host profile, as illustrated in step 835. If the profile is not yet complete, as determined in step 840, the Talker™ loops back and reads the next DEX frame and the process continues until the host profile has been updated. Once the profile has been updated, the host query process is complete and the Talker™ moves on to query the community, as shown in step 845.

If, on the other hand, in step 800 the host does not communicate using a standardized (or proprietary) communication protocol or format, then the Talker™ proceeds to operate in basic serial communication mode and it reads the host interface character by character, as shown in step 850. Upon reading the characters from the serial host interface, the characters are stored in the host profile as SMMP™ data Preferably, no conversion is required for basic serial data. Once the profile is complete, as determined by step 860, the host query process is complete and the Talker™ moves on to query the community, as shown in step 845. If the profile is not yet complete, the process loops back and reads the host interface again, as previously described.

Figure 20:
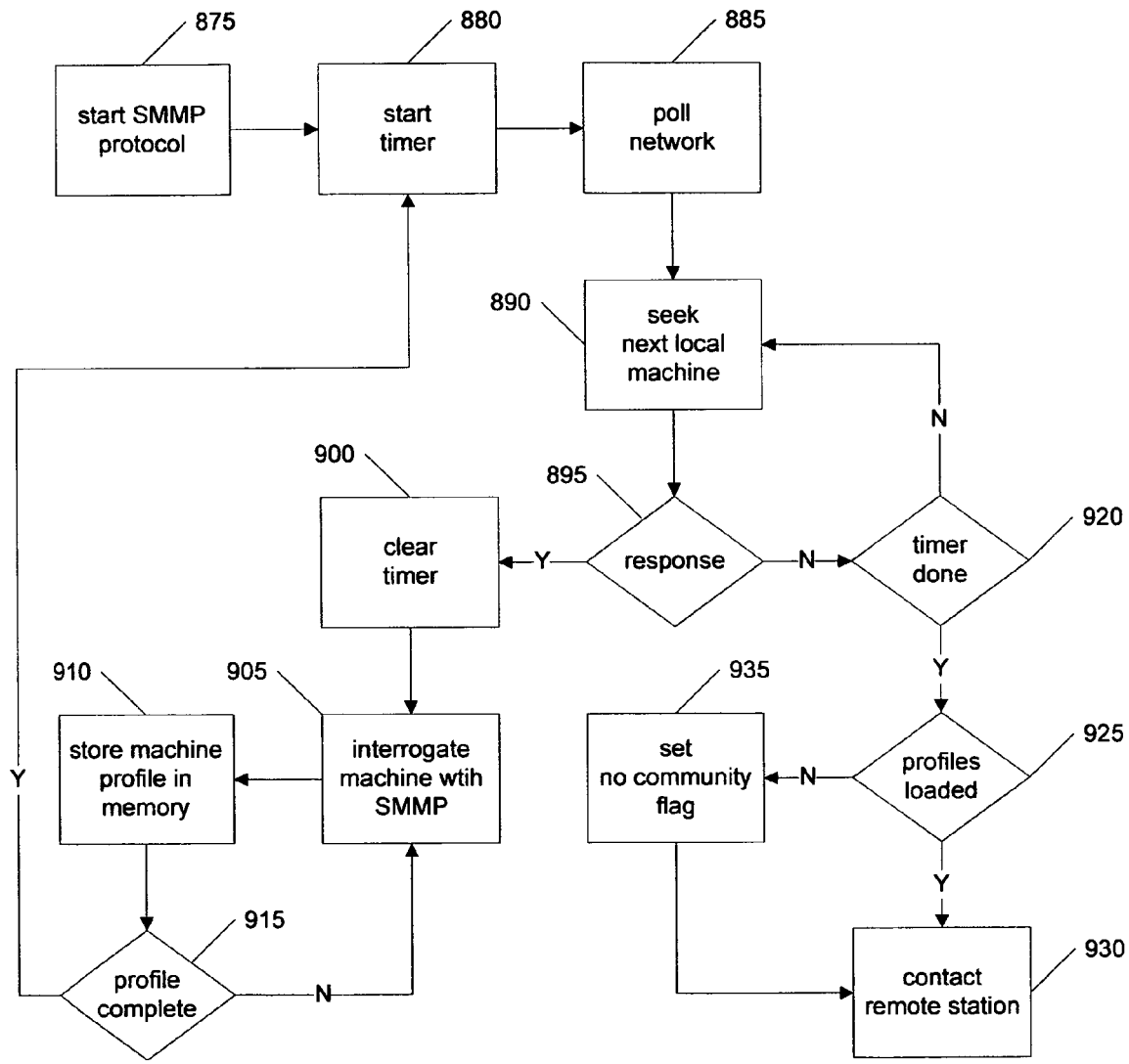
FIG. 20 is a flow diagram illustrating an example process for building a community profile according to an embodiment of the present invention.

FIG. 20 is a flow diagram illustrating an example process for building a community profile according to an embodiment of the present invention. Advantageously, each of the various Talkers™ in the local community is configured to communicate using the SMMP™ protocol. The communication can take place over various types of network infrastructures, including wired and wireless networks. Additionally, the SMMP™ protocol is adaptable for communication over various types of transport protocols, for example TCP. Thus, the machines in the local community are all networked together over an infrastructure and in communication with each other using the SMMP™ protocol.

Initially, in step 875, a Talker™ starts up the SMMP™ protocol for communication with the community. In step 880, the Talker™ starts a timer and then the Talker™ polls the network, as illustrated in step 885. The network polling may initially be a broadcast message to determine what other machines are in the local community. Such a broadcast poll allows the Talker™ to establish a list of machines in the local community and the address for each machine. Where the Talker™ already has a list of machines in the local community, the polling step can confirm that each machine is still part of the community as well as identify new machines that have been added to the community.

As shown in step 890, after polling the network, the Talker™ next communicates with a particular machine in the community. Upon receiving a response from the particular machine, as determined in step 895, the Talker™ resets the timer in step 900 and proceeds to interrogate the machine using the SMMP™ protocol. In step 910, the Talker™ stores the profile for the interrogated machine in local memory (or at least a portion thereof) and then determines if the profile is complete in step 915. If the profile is not yet complete, the process loops back and the interrogation continues as previously described with respect to step 905. Once the profile is complete, the process cycles back and starts the timer once again, as shown in step 880.

In the case where the Talker™ determines, in step 895, that there is no response from the particular machine, the Talker™ next determines if the timer is exhausted, as illustrated in step 920. If the time is not exhausted, the Talker™ cycles back to step 890 in the process to seek the next local machine in the list. If the timer is exhausted, then the Talker™ determines if any profiles have been loaded, as shown in step 925. If no profiles have been loaded, in step 935 the Talker™ sets a flag to indicate that there is no local community and then contacts the remote station to report in, as illustrated instep 930.

As can be seen from the above description, the described process will obtain a machine profile for each machine that is in the local community. When the last machine has been interrogated and the timer resets, no response will be forthcoming because no additional machines are available. Thus, when the final timer runs out, the process completes after the remote station is contacted in step 930.

Figure 21:
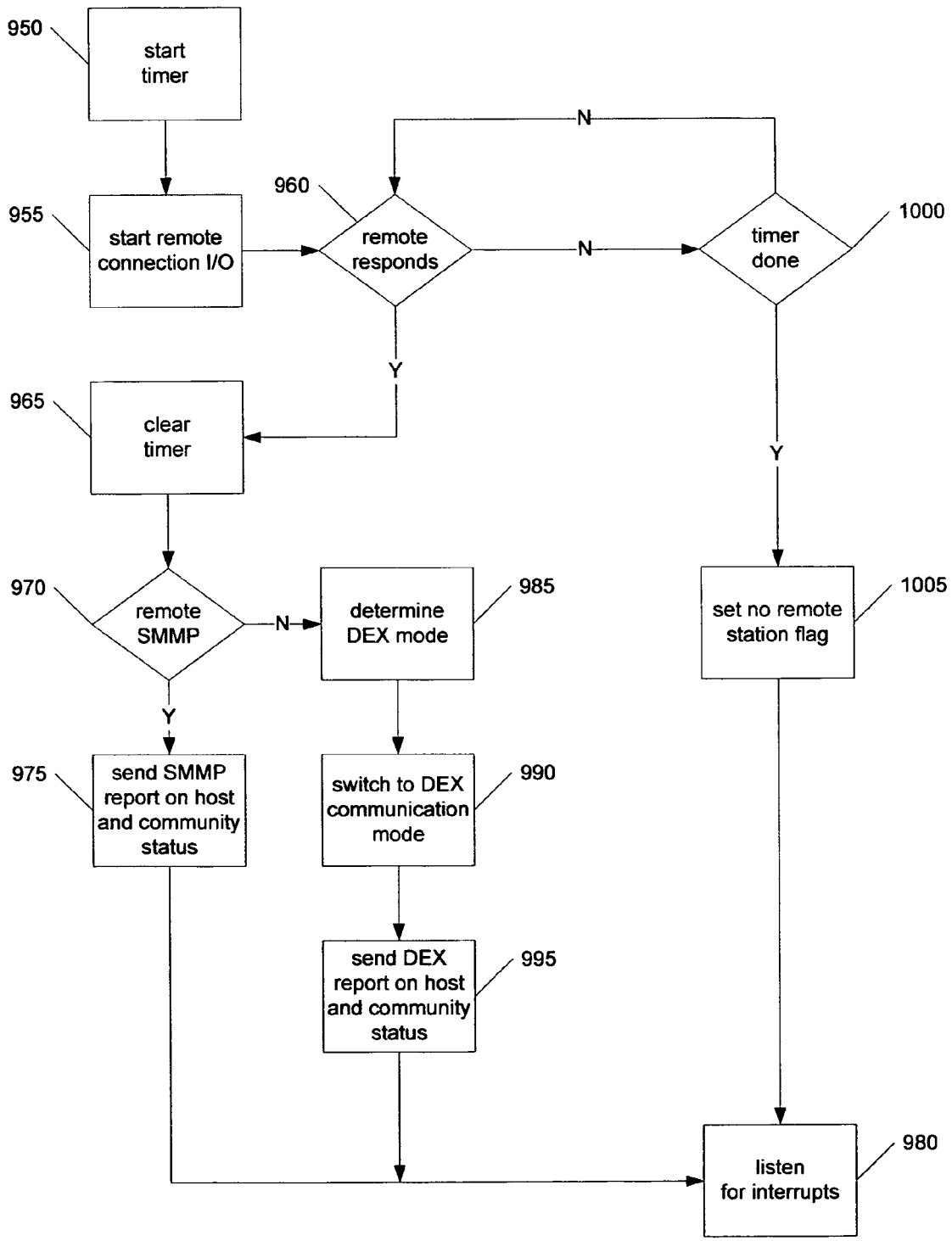
FIG. 21 is a flow diagram illustrating an example process for reporting to a remote station according to an embodiment of the present invention.

FIG. 21 is a flow diagram illustrating an example process for reporting to a remote station according to an embodiment of the present invention. In one embodiment, the information reported to a remote station includes demographics of the local community and the Talker's™ host. Such demographics may include the number of machines in the community, the type of machines, the inventory of the machines (if applicable) and other machine specific characteristics that are stored in the community profile. The initial use of this process can be during set-up of the Talker™ or can be implemented after the host and community profiles have been collected and stored.

When reporting to the remote station, the process begins in step 950 with the Talker™ starting a timer. The timer allows the Talker™ to keep track of the state of its communication with the remote station. In step 955, the Talker™ initializes a connection with the remote station. The connection with the remote station may be established through a wired or wireless communication link that uses a private, public, or combination of private and public network infrastructure.

After initializing the connection, the Talker™ waits to receive a response from the remote station, as illustrated in step 960. If the remote station does not respond, the Talker™ checks to see if the timer is exhausted, as illustrated in step 1000. If the time is not exhausted, the Talker™ loops back to check to see if the remote station has responded. This loop will iterate until the timer is exhausted or the remote station responds. When the timer is exhausted and the host is determined to be unavailable, the Talker™ sets an appropriate flag in step 1005 and then enters into a passive mode to listen for interrupts, as shown in step 980.

When the remote station does respond, the Talker™ clears the timer, as shown in step 965, and then determines if the remote station can communicate using the SMMP™ protocol, as illustrated in step 970. If the remote station is SMMP™ compatible, then the Talker™ sends one or more reports to the remote station, as shown in step 975. Once the reports have been sent, the Talker™ then enters into a passive mode and waits to receive an interrupt, as shown in step 975.

In the case where the remote station is not SMMP™ compatible, the Talker™ instead communicates with the remote station in a DEX format. Therefore, in order to communicate with the remote station, the Talker™ next determines the DEX mode, as illustrated in step 985. Once the DEX mode has been determined, in step 990 the Talker™ switches into the particular DEX communication mode and then sends the DEX format report on host and community status, as shown in step 995. After providing the information to the remote station, in step 980 the Talker™ enters the passive mode to listen for interrupts.

In an alternative embodiment, step 950 may be replaced with a step where the Talker™ receives a communication from the remote station. In such an embodiment, the same timer functions and negotiation of communication protocol may ensue. The difference being that the communication is initiated by the remote station rather than the Talker™.

Figure 22:
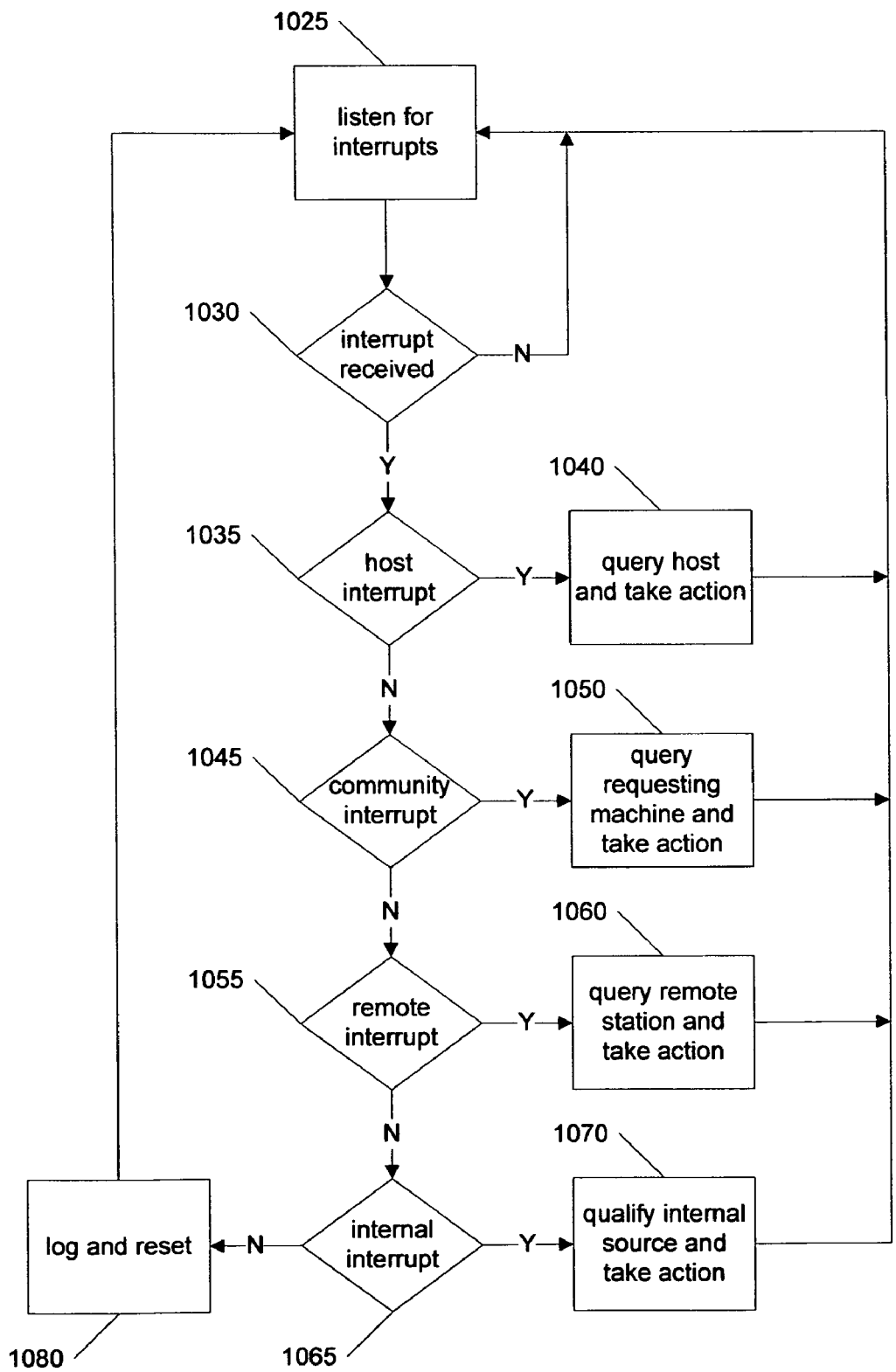
FIG. 22 is a flow diagram illustrating an example process for interrupt driven communication and host management according to an embodiment of the present invention.

FIG. 22 is a flow diagram illustrating an example process for interrupt driven communication and host management according to an embodiment of the present invention. Initially, in step 1025, the Talker™ is in a passive mode, listening for interrupts. Many of the previously described processes end at this step in the process. During this part of the process, the Talker™ continuously checks to see if an interrupt has been received, as illustrated in step 1030. If no interrupt is received, the Talker™ loops back and continues to listen for an interrupt. When an interrupt is received, as determined in step 1030, the Talker™ next determines the type of interrupt and stores the type and source in memory. Although the illustrated process describes a cascading decision tree, the interrupt may also be parsed in a single step to determine the interrupt type and source and then the appropriate action takes place.

In step 1035 the Talker™ determines if the interrupt is a host interrupt. If it is a host interrupt, in step 140 the Talker™ queries the host for details regarding the interrupt and the ensuing action(s) that needs to take place. These actions are then carried out and the Talker™ returns to step 1025 where it listens for additional interrupts.

In step 1045 the Talker™ determines if the interrupt is a community interrupt. If it is a community interrupt, in step 1050 the Talker™ polls the community for the requesting machine and interrogates the requesting machine for details regarding the interrupt and the ensuing action(s) that needs to take place. These actions are then carried out and the Talker™ returns to step 1025 where it listens for additional interrupts.

In step 1055 the Talker™ determines if the interrupt is a remote station interrupt. If it is a remote station interrupt, in step 1060 the Talker™ queries the remote station for details regarding the interrupt and the ensuing action(s) that needs to take place. These actions are then carried out, and the Talker™ returns to step 1025 where it listens for additional interrupts.

In step 1065 the Talker™ determines if the interrupt is an internal interrupt. If it is an internal interrupt, in step 1070 the Talker™ then qualifies the internal source of the interrupt and carries out the action that needs to take place. Once the action has taken place, the Talker™ returns to step 1025 where it listens for additional interrupts.

If the interrupt is not an internal interrupt, or if the interrupt is otherwise unknown to the Talker™, the Talker™ then logs the spurious interrupt and resets in step 1080 prior to returning to step 1025 where it continues to listen for additional interrupts.

In one embodiment the available set of interrupts is described in the following table. Those having skill in the art will recognize the desirability and availability of other types of interrupts and all such other types are contemplated by the scope of the present invention.

| Interrupt Type (Source) | Action |
| --- | --- |
| Update (Host Interrupt) | Query host and compare content to stored host profile and update if necessary |
| Alert (Host Interrupt) | Query host and decide on severity of problem |
| Action Required (Host Interrupt) | Query host to determine what info to send to remote station |
| Some Machine Wants to Talk (Community Interrupt) | Respond directly to machine or poll community to determine which machine |
| Query From Remote Site (Remote Interrupt) | Connect to remote station and exchange information |
| Command From Remote Site (Remote Interrupt) | Connect to remote station to accept command and take action |
| Inaction Timer Expired (Internal Interrupt) | Wake up and query host |
| Reset Signal (Internal Interrupt) | Reset all and remain in passive state for interrupts |
| Power Off - On Standby Battery (Internal Interrupt) | Set flag and notify remote station |
| Watchdog Timer (Internal Interrupt) | Hard reset from current state and report to remote station |

With respect to the following description of FIGS. 23-27, it should be recognized that these new processes are similar to the previously described processes with the exception that each of the processes in FIGS. 23-27 takes place after the initial host and community profiles have been established. Thus, a necessary comparison step may be included with additional notification steps where necessary.

Figure 23:
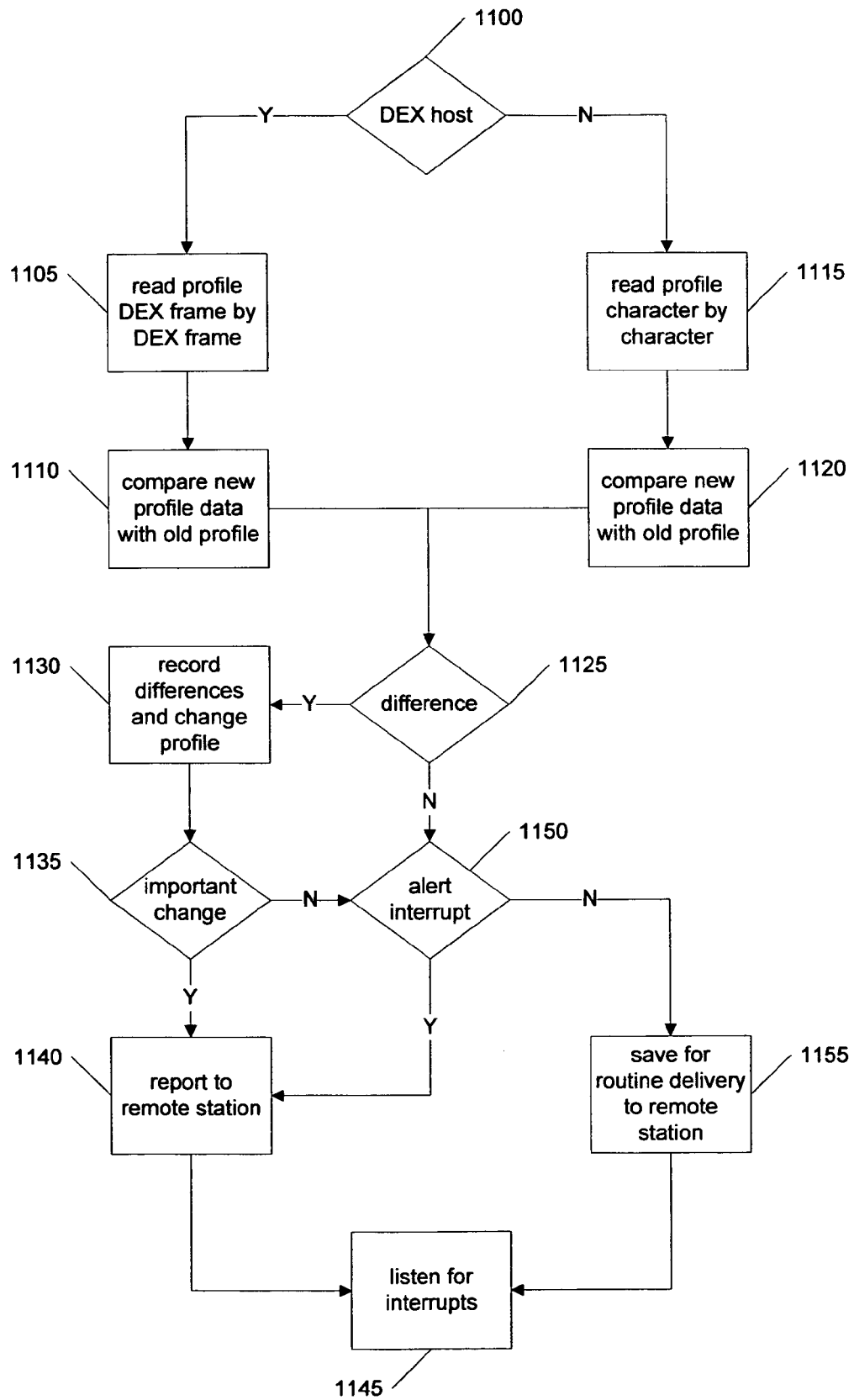
FIG. 23 is a flow diagram illustrating an example process for querying a host machine according to an embodiment of the present invention.

FIG. 23 is a flow diagram illustrating an example process for querying a host machine according to an embodiment of the present invention. Execution of this process may take place in order for a Talker™ to determine why the host has sent an interrupt or because there has been no contact with the host for a predetermined period of time.

Initially, in step 1110, the Talker™ determines if the host is compatible with a particular DEX format. Advantageously, this status may be determined by consulting a flag or a database field that is set to reveal the preferred or only type of communication ability for the host. Alternatively, the Talker™ may cycle through the available DEX formats to determine the optimal communication format, as illustrated in step 1110.

If the host is compatible with a certain DEX format, (i.e., speaks a particular language) then the Talker™ reads and stores a DEX frame from the host in step 1105. This frame is then compared in step 1110 with the existing DEX frame that is stored in memory to determine if any changes have been made. Alternatively, if the host is not DEX format compatible, (i.e., doesn't speak a particular language) then the Talker™ reads data from the host in a character by character procedure as illustrated by step 1115. Once the data has been read, the data is similarly compared with the character data stored in the host profile.

In both cases, once the comparison has been made, in step 1125 the Talker™ determines if there is any difference in the old and new host profiles. If there is a difference, the Talker™ records those differences and updates the host profile, as illustrated in step 1130. In step 1135, the Talker™ determines if the change was significant. This may be done by examining the particular fields that were updated to see if any significant fields were updated. Advantageously, the Talker™ may have a pre-determined list of significant fields. If the change was significant, the Talker™ may then immediately report the change to the remote station, as shown in step 1140. Once the change has been reported, the Talker™ then enters into a passive mode and listens for additional interrupts.

If the Talker™ determines in step 1135 that the change was not significant, or if the Talker™ determines that there is no difference between the new and old host profiles in step 1125, then in step 1150 the Talker™ determines if the host has sent an alert interrupt that needs to be immediately reported. If the Talker™ determines that it has received an alert interrupt, the Talker™ reports the alert interrupt to the remote station in step 1140 and then returns to the passive state in step 1145 to listen for interrupts.

In step 1150 if the Talker™ determines that no alert interrupt has been received, then in step 1155 the status of the change or no-change is saved for routine delivery to the remote station, for example in a periodic report or in response to a query. Once the status is saved for later delivery, the Talker™ returns to the passive state in step 1145 and listens for interrupts.

Figure 24:
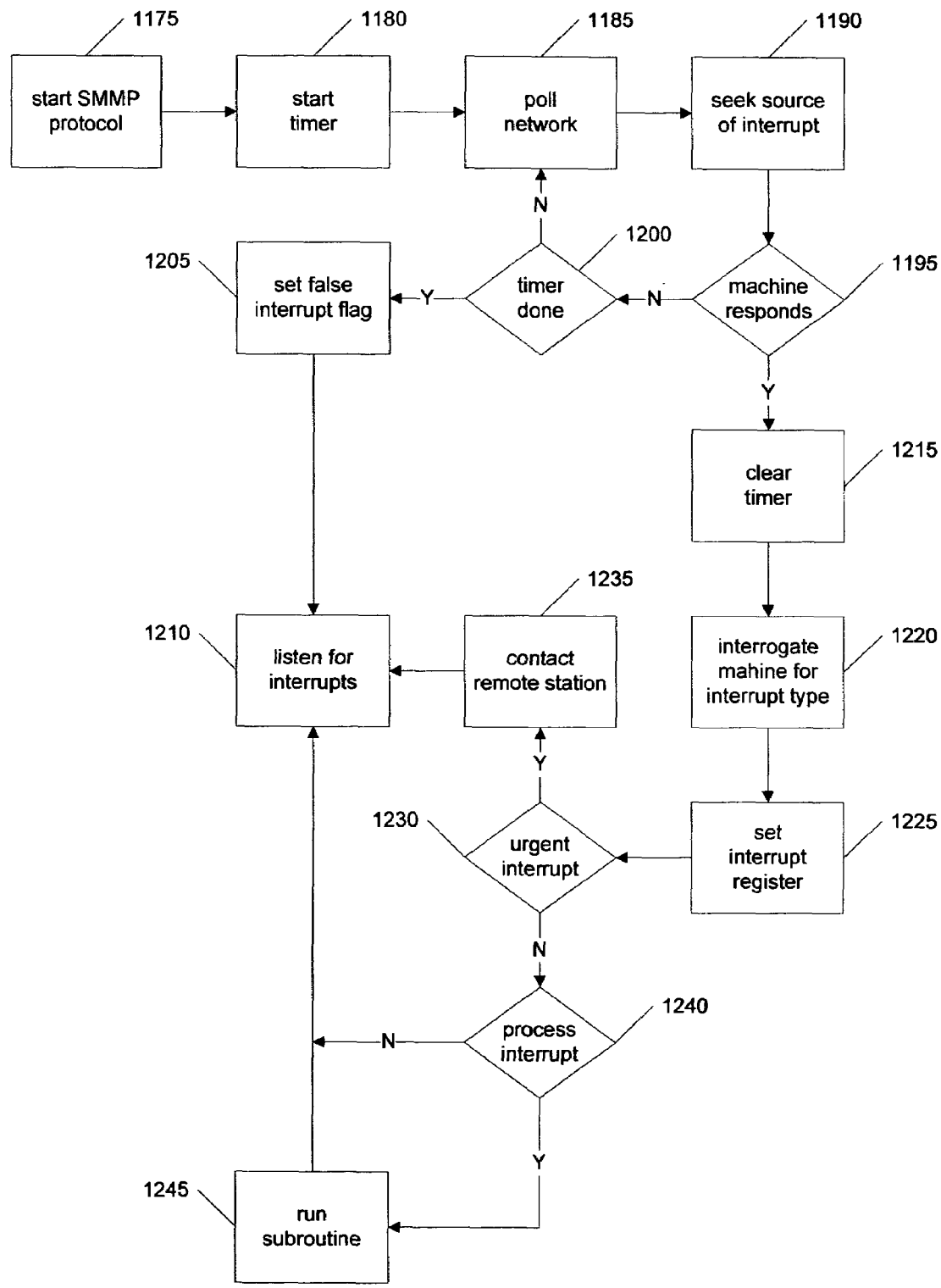
FIG. 24 is a flow diagram illustrating an example process for querying a community of Talkers™ according to an embodiment of the present invention.

FIG. 24 is a flow diagram illustrating an example process for querying a community of Talkers™ according to an embodiment of the present invention. The process begins when the Talker™ receives a community interrupt. Upon receipt of such an interrupt, the Talker™ starts the SMMP™ communication protocol in order to communicate with the local community, as illustrated in step 1175. In one embodiment, the interrupt contains the address of the querying machine from the network and the Talker™ then determines the requesting machine in a single step by parsing the interrupt.

In the illustrated embodiment, the Talker™ next starts a timer in step 1180 and then polls the network in step 1185 to determine the source of the interrupt. Once a potential source machine responds, the Talker™ then queries the potential source of the interrupt in step 1190 and determines if the machine responds in step 1195. If the potential source machine does not respond (indicating that it may not be the actual source machine), the Talker™ checks the timer to see if it has been exhausted, as shown in step 1200. If the timer has been exhausted, then the Talker™ sets a false interrupt flag in step 1205 and returns to a passive state to listen for additional interrupts in step 1210.

If the timer is not exhausted in step 1200, then the Talker™ returns to step 1185 to poll the network for potential source machines and the process repeats. In step 1195, if the potential source machine responds, indicating that it is the source of the interrupt, then the Talker™ resets the timer in step 1215. In step 1220, the Talker™ next interrogates the machine to determine the interrupt type. Once the interrupt type has been determined, the Talker™ next saves the type and severity level of the interrupt in the interrupt register.

Upon determining the type and severity of the interrupt in step 1225, the Talker™ then determines in step 1230 if the particular interrupt is an urgent interrupt. Advantageously, the Talker™ may be configured with a pre-determined list of urgent interrupt types. If the interrupt is not urgent, the Talker™ next determines if the interrupt is a process interrupt from the source machine, as illustrated in step 1240. If the interrupt is a process interrupt, then the Talker™ runs the appropriate subroutine (i.e., the requested subroutine) in step 1245 and then returns to the passive state and proceeds to listen for interrupts in step 1210.

If the interrupt is not a process interrupt, as determined in step 1240, then the Talker™ saves the interrupt data for routing reporting and returns to the passive state in step 1210 and listens for additional interrupts. If the interrupt is urgent, as determined in step 1230, then the Talker™ contacts the remote station and reports in prior to returning to the passive state in step 1210 and listening for additional interrupts.

Figure 25:
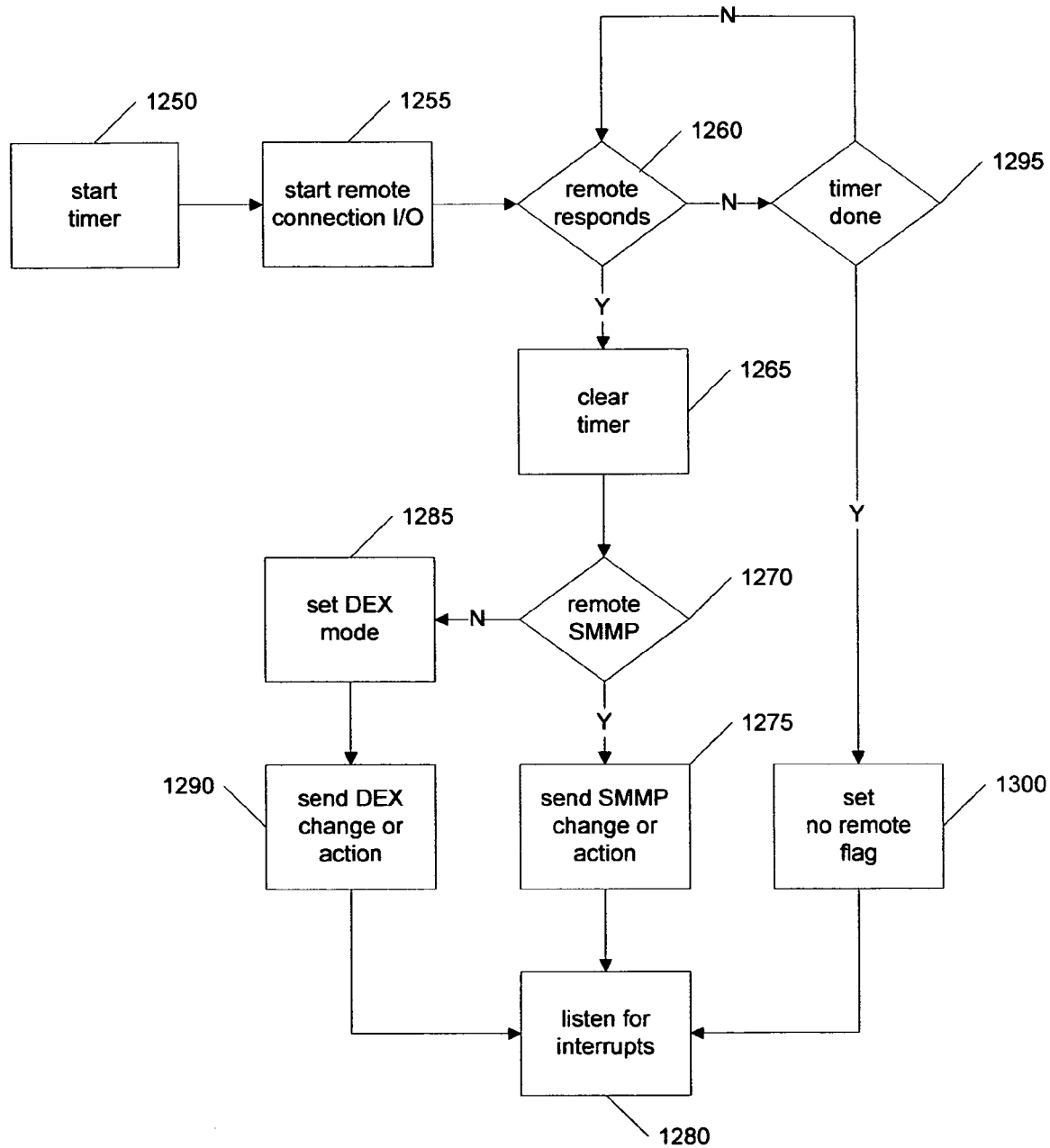
FIG. 25 is a flow diagram illustrating an example process for reporting to remote station according to an embodiment of the present invention.

FIG. 25 is a flow diagram illustrating an example process for reporting to remote station according to an embodiment of the present invention. This process begins when the Talker™ receives an interrupt (internal, host, or community) that requires reporting to the remote station. This process may also be employed when the Talker™ receives a communication from the remote station (i.e., a remote interrupt).

Initially, in step 1250 the Talker™ starts a timer to keep track of the communication state. In step 1255 the Talker™ initializes the connection with the remote station. The remote connection can be over a wired or wireless network with various infrastructures as previously described. If the remote station does not respond to the request to establish communication, as determined in step 1260, then the Talker™ checks to see if the timer has expired, as illustrated in step 1295. If the timer has not expired, the process loops back to step 1260 to determine if a response has been received from the remote station. If the timer has expired, then the Talker™ sets a flag in step 1300 indicating that no remote station is available and returns to the passive state to listen for additional interrupts.

If the remote station does respond in step 1260, the Talker™ next resets the timer in step 1265 and then checks to see if the remote station is configured for SMMP™ communication. The remote station communication mode may already be determined and advantageously stored in a database field, memory register, or flag setting. Otherwise, the Talker™ proceeds to determine if the remote station is SMMP™ compatible, as illustrated in step 1270. If the remote station is not SMMP™ compatible, in step 1285 the Talker™ next determines the optimal communication method (e.g. DEX format) for the remote station and then sends the data to the remote station in step 1290. For example, the data sent to the remote station may comprise a change of information, a change in status, or an important alert or interrupt. Once the information has been sent to the remote station, the Talker™ returns to the passive state in step 1280 to listen for additional interrupts.

If the remote station is determined to be SMMP™ compatible in step 1270, the Talker™ then sends the changed information or action to the remote station in step 1275 using the preferred SMMP™ protocol. Once the data or update has been sent to the remote station, the process is complete and the Talker™ returns to the passive state in step 1280 and listens for additional interrupts.

Figure 26:
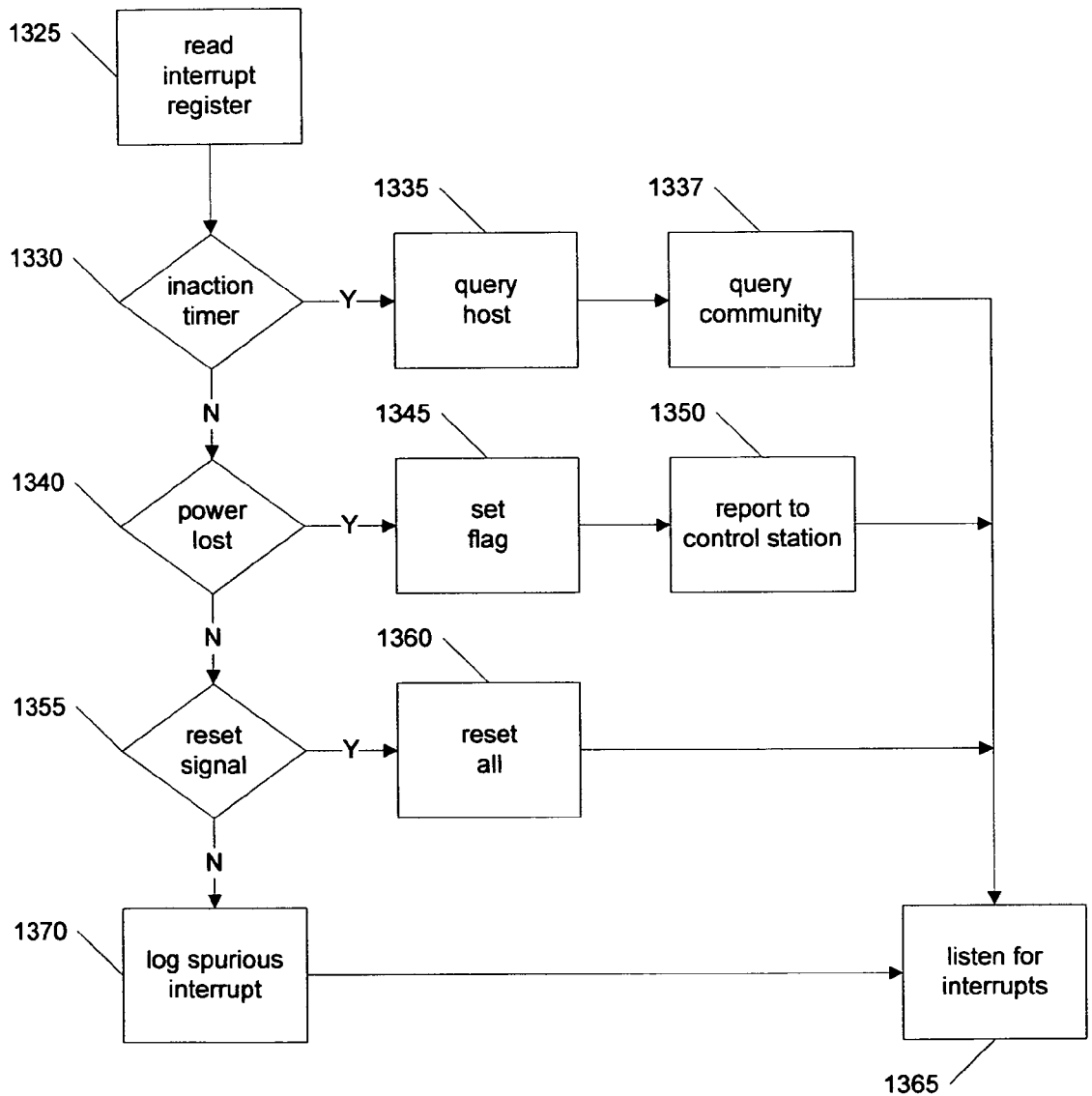
FIG. 26 is a flow diagram illustrating an example process for taking action upon receiving an interrupt according to an embodiment of the present invention.

FIG. 26 is a flow diagram illustrating an example process for taking action upon receiving an internal interrupt according to an embodiment of the present invention. The process of servicing internal interrupts is initiated in step 1325 when the Talker™ determines that the interrupt is an internally generated interrupt. In one embodiment, the sources for an internal interrupt can include an inaction timer, a power lost indicator, and a reset signal. Once the interrupt register has been read and the interrupt identified as an internal interrupt, the process next determines the type of internal interrupt. In one embodiment, the type of internal interrupt can be determined in a single step by parsing the interrupt to reveal the information.

In the illustrated embodiment, the Talker™ first checks to see if the interrupt is an inaction timer, as shown in step 1330. If it is an inaction timer interrupt, then the Talker™ takes the action of querying the host in step 1335. This is because the inaction timer interrupt indicates that the host has not been queried in a pre-determined period of time. Querying the host provides the Talker™ with host profile information that can be compared to the existing host profile information to determine if the host profile needs to be updated.

After the action of querying the host is completed (as previously described with respect to FIG. 19) the Talker™ next takes the action of querying the local network (i.e., the community). This action allows the Talker™ to keep its community profile up to date and determine whether any changes have occurred since the most recent community profile update. After the community profile has been updated (as previously described with respect to FIG. 20), the Talker™ then returns to the passive state to listen for additional interrupts in step 1365.

If the interrupt is not an inaction timer interrupt, the Talker™ next checks to see if the interrupt is a power lost interrupt, as illustrated in step 1340. If the interrupt is a power lost interrupt, then the Talker™ sets a flag in step 1345 indicating that power has been lost and then reports to the remote station as shown in step 1350. After completing the previously described process for reporting to the remote station, the Talker™ will return to the passive state and listen for additional interrupts.

In one embodiment, if the external power is lost the Talker™ can advantageously shift over to a battery power source such as a lithium battery for continued operation. After switching over to the battery power source, the Talker™ initiates an internal power loss interrupt so that the remote station will be informed of the power loss. Alternatively, if the Talker™ was previously operating from battery power but the trickle charging source was lost, the same interrupt can advantageously be generated.

If the interrupt is not a power lost interrupt, the Talker™ next checks to see if the interrupt is a reset signal. If the interrupt is a reset signal, in step 1360 the Talker™ will set a flag indicating a reset has occurred and then reset itself. Once the reset has occurred, the Talker™ will return to the passive state in step 1365 and listen for additional interrupts.

If the interrupt is not a reset signal, or if it is otherwise not a recognized interrupt, in step 1370 the Talker™ logs the spurious interrupt and then returns to the passive state in step 1375 to listen for additional interrupts.

Figure 27:
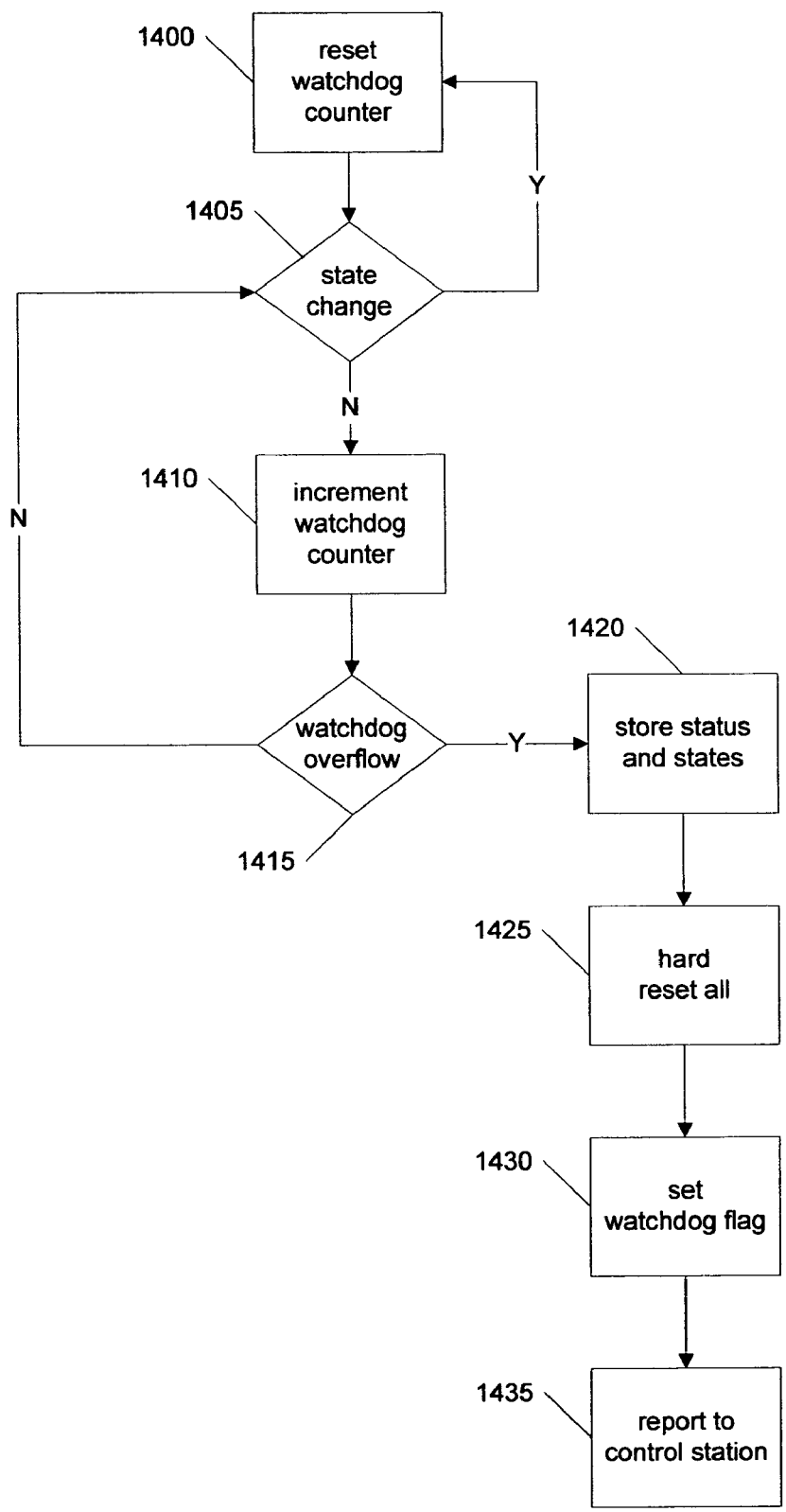
FIG. 27 is a flow diagram illustrating an example process for monitoring state changes according to an embodiment of the present invention.

FIG. 27 is a flow diagram illustrating an example process for monitoring state changes according to an embodiment of the present invention. The process initiates in step 1400 by resetting the watchdog counter. This step would normally take place upon initialization of the Talker™, for example upon first power up. Once the counter is reset or otherwise initialized, the watchdog process monitors to see if a state change has occurred within the Talker™ system, as shown in step 1405. When a state change does occur, the counter resets. Preferably, the process loops back and forth between these steps, continuously resetting the counter and watching for state changes.

If no state change is detected within a pre-determined period of time, the watchdog process increments the watchdog counter in step 1410 and checks to see if the counter has exceeded its pre-determined upper limit in step 1415. If the counter has not yet exceeded the upper limit, then the watchdog process continues to monitor for state changes. As can be seen, the watchdog process continuously cycles through incrementing the counter and resetting the counter as the Talker™ proceeds through the various state changes inherent in normal operation.

If the watchdog counter does exceed its upper limit as determined in step 1415, however, then the Talker™ has been idle too long and a failed status is presumed. At this point, in step 1420 the status of the Talker™ and its current state information is saved in memory and the Talker™ is reset, as illustrated in step 1425. The reset can be of any variety of resets including a complete hard reset or an incremental reset of particular sub-routines that may be causing the failed status. Once the Talker™ has been reset, the watchdog flag is set in step 1430 to indicate that the system experienced a failure and a report to the remote station is initiated in step 1435. Upon reset of the Talker™, the watchdog process is re-initialized in step 1400. Advantageously, the Talker™ status and state information saved in memory can be examined later by maintenance personnel to determine what caused the failed status.

Figure 28:
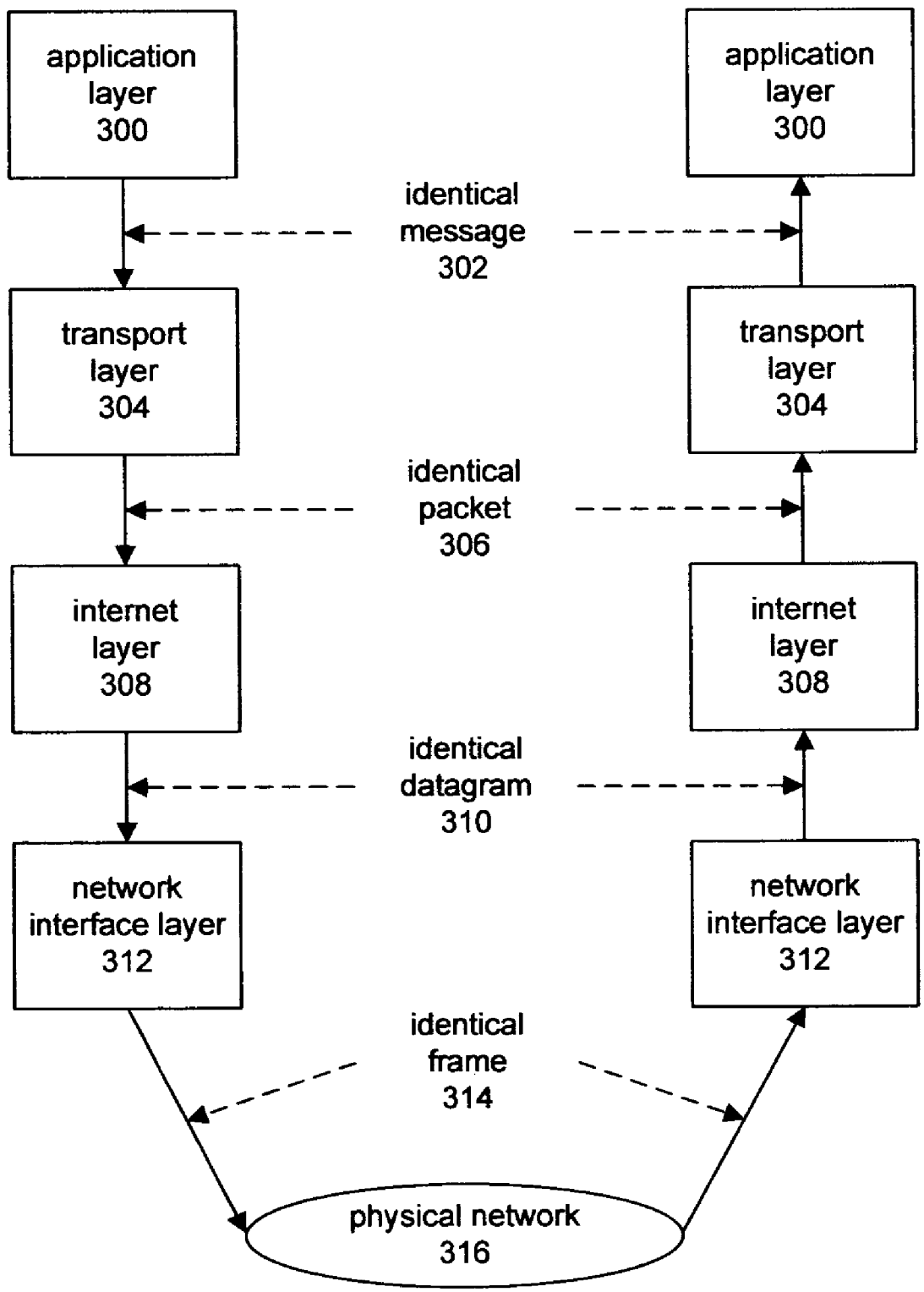
FIG. 28 is a block diagram illustrating a protocol layering principle according to an embodiment of the present invention.

FIG. 28 is a block diagram illustrating a protocol layering principle for TCP/IP networking environments according to an embodiment of the present invention. Messages passed from a first computer to a second computer may first travel down the protocol layers of the first computer, then travel across a network, and then travel up the protocol layers of the second computer.

For example, a communication from an application running on a first computer originates in application layer 300. This communication may be passed by the application as message 302 to the transport layer 304. The transport layer 304 may pass the message 302 as packet 306 to the internet layer 308. The internet layer 308 may then pass the packet 306 as datagram 310 to the network interface layer 312. The network interface layer 312 may then pass the datagram 310 as network specific frame 314 to the physical network 316.

The network specific frame 314 may travel across the physical network 316 or across multiple physical networks 316 to its destination in a second computer. Upon reaching its destination, the identical frame 314 may be received at the network interface layer 312. The network interface layer 312 may then pass the frame 314 as datagram 310 to the internet layer 308. The internet layer 308 may then pass the datagram 310 as packet 306 to the transport layer 304. The transport layer 304 may then pass the packet 306 as message 302 to application layer 300 where the message is received as a communication in an application. Frame 314, datagram 310, packet 306 and message 302 are identical when traveling between the protocol layers in a TCP/IP networking environment.

Figure 29:
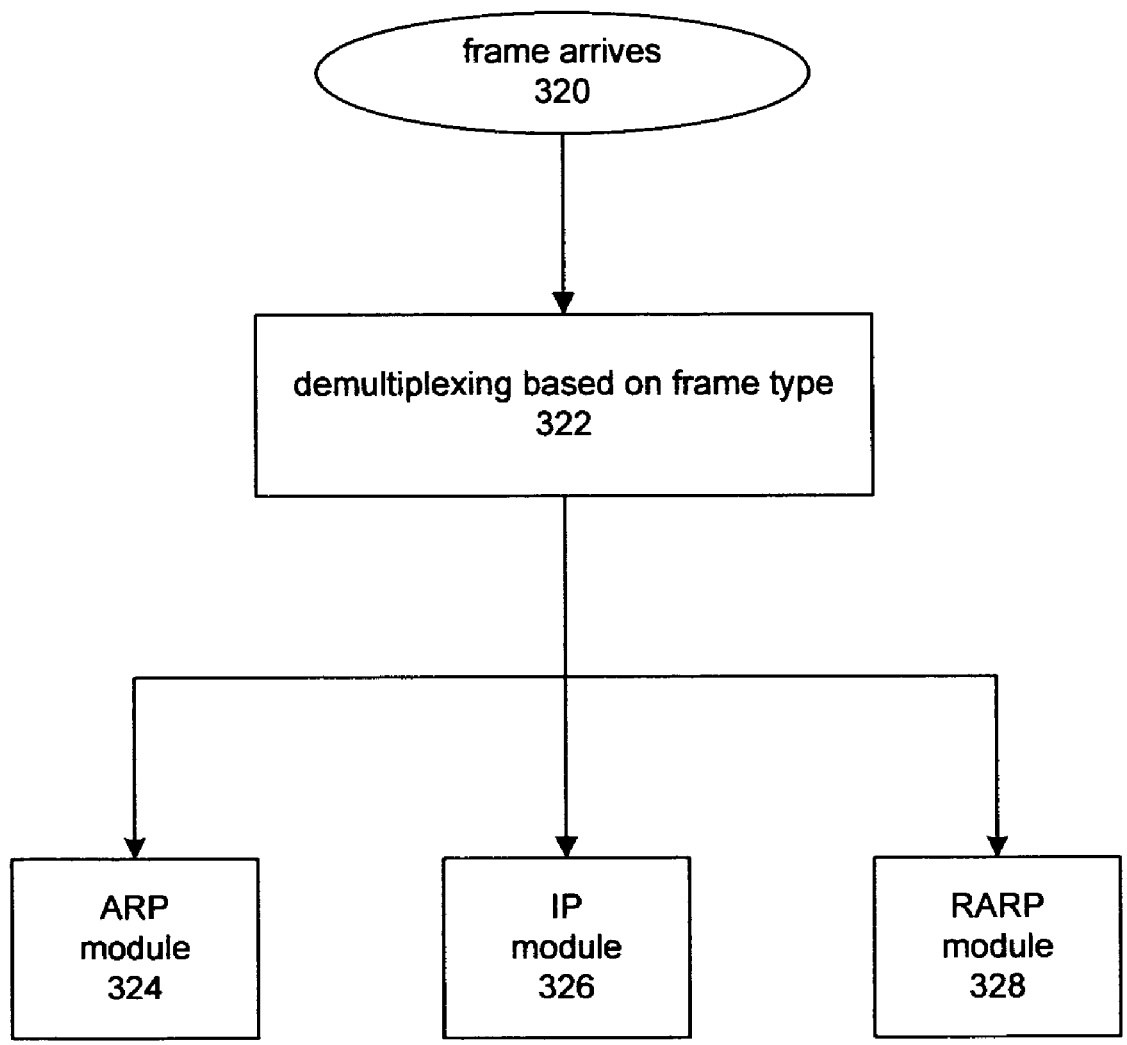
FIG. 29 is a flow diagram illustrating a technique for demultiplexing incoming data packets based on a protocol type found in the frame header according to an embodiment of the present invention.

FIG. 29 is a flow diagram illustrating a technique for demultiplexing incoming data packets, or frames, based on a protocol type found in the frame header. Communication protocols employ multiplexing and demultiplexing techniques between protocol layers in TCP/IP networking environments. For example, when sending a communication, the source computer may include additional information such as the message type, originating application, and protocols used. Eventually, all messages are placed into network frames for transfer and combined into a stream of data packets. At the receiving end, the destination computer uses the additional information in the network frame to guide the processing of the communication.

For example, in step 320, a frame arrives at the destination computer. Once the frame has been received, the frame is parsed to determine the frame's particular type, as illustrated in step 322. A frame may be one of a variety of frame types. Example frame types include, but are not limited to, address resolution protocol ("ARP"), internet protocol ("IP"), and reverse address resolution protocol ("RARP").

Once the frame type has been determined, the content of the frame is passed to a module that is capable of processing the datagram. For example, an ARP datagram may be passed to ARP module 324 for processing. Alternatively, if the frame type indicated an IP datagram, the IP datagram may be passed to IP module 326 for processing up to the next layer in the protocol stack. Additionally, a RARP datagram may be passed to RARP module 328 for processing.

Figure 30:
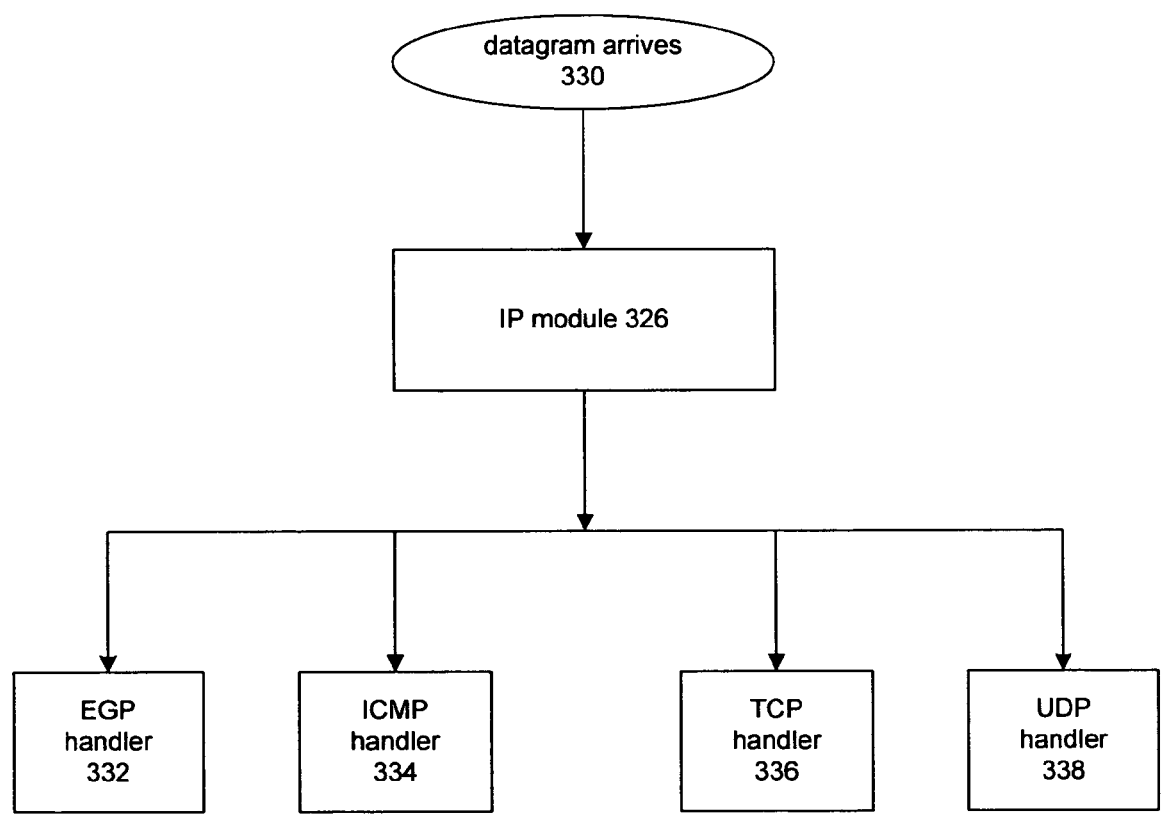
FIG. 30 is a flow diagram illustrating a technique for demultiplexing incoming data packets based on a type found in the IP datagram header according to an embodiment of the present invention.

FIG. 30 is a flow diagram illustrating a technique for demultiplexing incoming datagrams based on a type found in the IP datagram header. Similar to the processing of frames, IP datagrams may be parsed to determine how to process the particular datagram. For example, in step 330 an IP datagram arrives and is routed to the appropriate module for processing. IP module 326 may parse the datagram to determine the datagram type. Example datagram types include, but are not limited to, internet control message protocol ("ICMP"), user datagram protocol ("UDP"), transport control protocol ("TCP"), and exterior gateway protocol ("EGP").

Once the datagram type has been determined, IP module 326 may select a protocol handler for the packet included in the datagram. For example, an EGP datagram may be forwarded to EGP handler 332. Similarly, an ICMP datagram may be forwarded to ICMP handler 334 while a TCP datagram may be sent to TCP handler 336 for processing up to the next layer in the protocol stack. Additionally, a UDP datagram may be sent to UDP handler 338 for processing.

Figure 31:
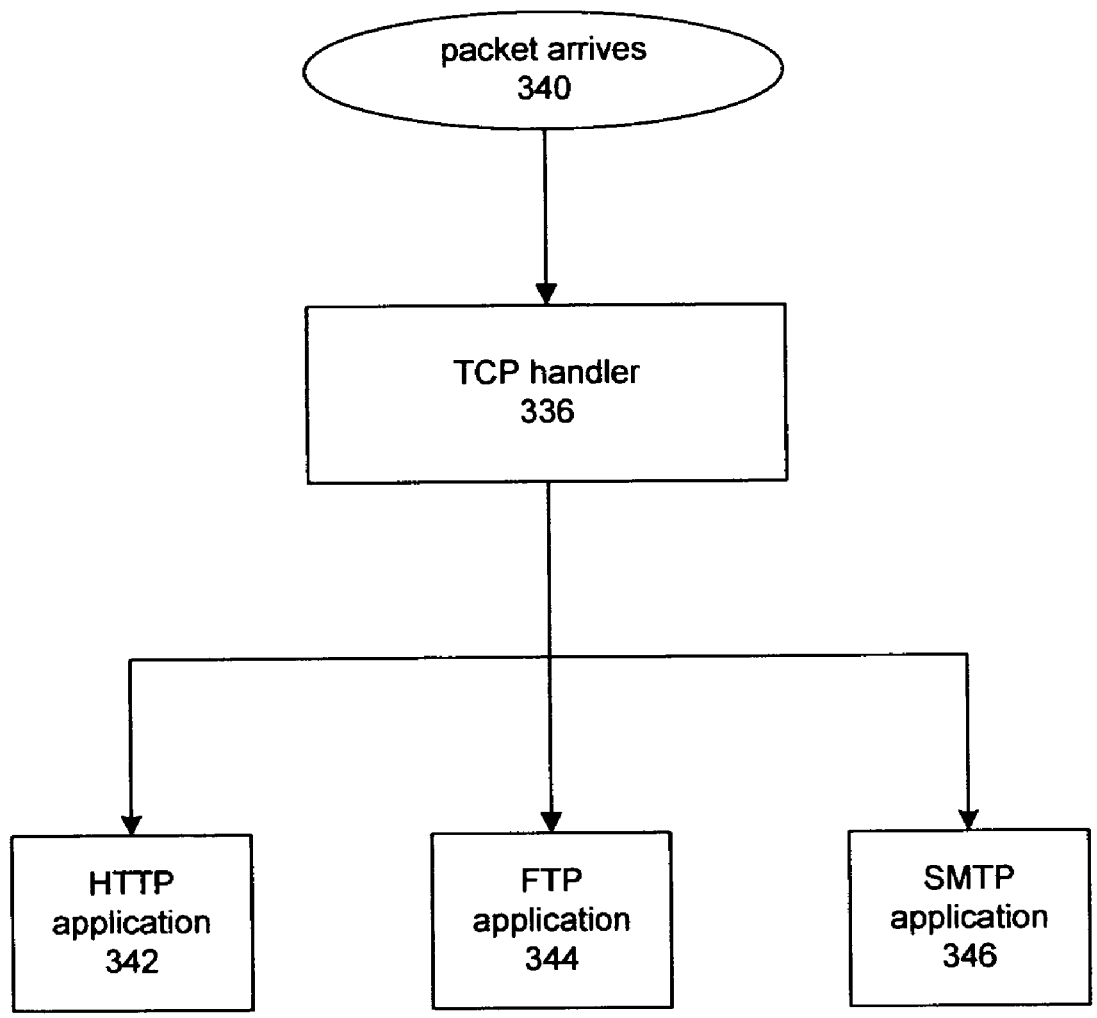
FIG. 31 is a flow diagram illustrating a technique for demultiplexing incoming data packets based on a type found in the TCP packet header according to an embodiment of the present invention.

FIG. 31 is a flow diagram illustrating a technique for demultiplexing incoming messages based on a type found in the TCP packet header. Similar to the processing of frames and datagrams, TCP messages may be parsed to determine which application is suited to receive the particular message type. For example, in step 340 a TCP message arrives and is routed to the TCP handler 336 for the appropriate processing. TCP handler 336 may parse the message to determine the message type and the particular originating application.

Example message types include, but are not limited to, hyper text transfer protocol ("HTTP"), file transfer protocol ("FTP"), and simple mail transfer protocol ("SMTP"). An extensive set of applications are commercially available for use with these and other message types. For example, Netscape Navigator and Microsoft Explorer are applications that use HTTP messages; WFTP is an application that uses FTP messages, and Eudora and Microsoft Outlook are applications that use SMTP messages. Additional examples of applications are well known, although not mentioned herein.

Once the message type has been determined by TCP handler 336, the message may be routed to the appropriate application for processing. For example, an HTTP message may be forwarded to HTTP application 342. Similarly, an FTP message may be forwarded to FTP application 344 while an SMTP message may be sent to SMTP application 346 for processing by the application and possibly delivery to an end user.

Figure 32:
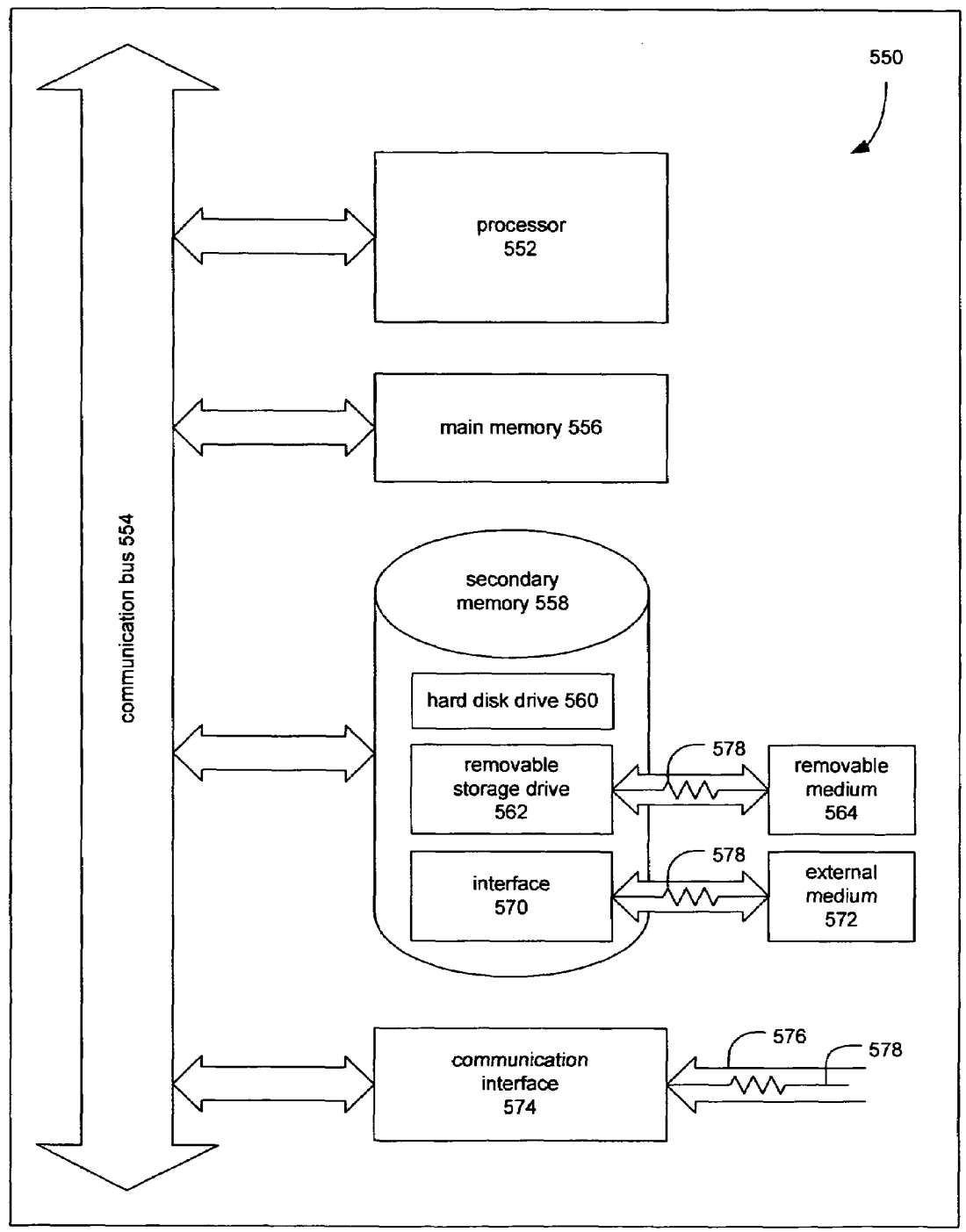
FIG. 32 is a block diagram illustrating an exemplary computer system as may be used in connection with various embodiments described herein.

FIG. 32 is a block diagram illustrating an exemplary computer system 550 that may be used in connection with the various embodiments described herein. For example, the computer system 550 may be used in conjunction with a controlling device, a user access station, a MachineTalker™ a general communications device, or other types of devices integral to the systems and methods described herein. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fibre Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of communication means including wire or cable, fiber optics, conventional phone line, cellular phone link, radio frequency (RF) link, or infrared link, just to name a few.

Computer executable code (i.e., computer programs or software) are stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Exemplary Embodiments

The basic elements of the invention are embodied in several MachineTalker™ versions including MiniTalkers™ and MicroTalkers™ and MacroTalkers™. Each of these are the same except for size and extended capabilities. Each Talker™ is made to embody the personality of the machine or host to which it is attached. Each Talker™ takes on the character of its host and represents that host to the outside world.

Talker™ have processing capability in that they are able to reconfigure themselves in accordance with the host system. Each Talker™ is able to perform its designated tasks due to instructions down-loaded at the factory or from an adjacent Talker™ that knows what is to be accomplished for the designated application. Once given its orders each Talker™ is capable of acting on its own under control of the programs loaded into it.

The invention described herein is such that its usefulness transcends various applications and industries. There are at least seven features that underlie the invention and that permit this versatility, they include:

1) Self-configuration of the network that will constitute the environment or community of Talkers™ and their respective hosts;

2) The profiles that each Talker™ builds and stores away that contain relative information about its host and the rest of the community;

3) The ability of multiple Talkers™ in a community to react to each other and to share information about status, content, relationships, inventory or bills of material and also alerts due to mismatch, errors and troubles;

4) The ability to relate multiple levels of information and report such to remote sites with regard to the other Talkers™ in a community and their hosts;

5) The ability to operate in stand-alone mode as an intelligent member of a community of Talkers™ that may, or may not, represent hosts and thereby to participate in the shared decision processes as programmed for the community;

6) The creation and use of the SMMP™ language that functions to simplify the control and representation by Talkers™ of machines and entities; and the access to that SMMP™ for the programming of applications through the use of XML, a high level, ubiquitous programming language; and 7) The ability to eliminate the requirement for multi-wire cables for the interconnection of sub-assemblies due to the built-in intelligence of each Talker™ in an assembly or community to self-configure and to perform its tasks on its own when mounted in proximity to other Talkers™.

A. Factory and Assembly Line Automation

Using an automobile assembly as a representative of the various types of sequential manufacturing processes, each new chassis that starts down the assembly line begins with the attachment of a resident MachineTalker™. The Talker™ is provided with a blueprint of the entire vehicle (or other type of product) so that the Talker™ can configure, guide, and control the assembly process.

As the new vehicle moves down the line, sub-assemblies equipped with MachineTalkers™ identify themselves to the controlling MachineTalker™ as they are mounted in place. This reporting as the sub-assemblies come together results in continuously monitored Quality Assurance where presence or absence of necessary components is immediately noted by the controlling Talker™. Advantageously, periodic Talkers™ may be placed along the assembly line to accept reports from the controlling Talker™ regarding the status of the vehicle (or other product).

B. Self-Controlled Production Lines

MachineTalkers™ can be attached to selected products, assemblies, sub-assemblies and component parts that are in inventory. Once activated, the Talkers™ recognize such parts and assemblies as their hosts machines. As the assembly process unfolds, the Talkers™ self coordinate into a community that will, at a certain point, recognize that the assembly process is complete. If, at the end of the production line the community of Talkers™ determines that the product or inventory is not complete, the Talkers™ report the fault and can even make recommendations as to specific corrections.

A richer implementation comes about when the MachineTalkers™ are programmed to perform diagnostics on selected parts, and on selected assemblies of parts as they travel between fabrication or assembly stations. In this instance, testing stations can be taken out of the line and workflow is increased. As an alternative, a traveling MachineTalker™ can form a temporary community with a test station to receive its testing and providing responses in real time.

In the event of negative results during internal testing by the MachineTalker™ the Talker™ can report diagnostic troubles to designated stations. Since the collective Talkers™ know the problem, the capability and availability of re-work stations, they can schedule a new route that takes advantage of temporary downtimes and availability. The master plan is not necessarily notified, queried, or altered.

If they are portable, some or all of the MachineTalker™ modules can be removed at the end of the production line and reused in the assembly process. Depending on the product under assembly, a number of Talker™ units may remain on the finished goods to assist in inventory control and later consolidation with other Talkers™ at a higher level.

C. Finished Goods Confirmation

Information about the original specification of a product to be manufactured is inserted into the assigned Talker™ unit that travels with the assembly or that is attached to a carton being filled with components. The Talker™ will then know what parts must be included in the final package and upon comparison, if an incorrect part is attached or included in the box, the Talker™ can send an alert to Quality Control. If a component is omitted, a job completion confirmation is not made. If the goods have reached shipment status with a part missing, the goods will be rejected from the production line until the missing part is requested and installed. Once installed, the Talker™ can verify that all components on the Bill Of Materials are included and functional.

D. Logistics

Logistics control uses sets and subsets of MachineTalkers™. When subsets indicate that each component is present the subset can then be included into a full set. MachineTalker™ modules will therefore function simultaneously on several levels to report completion and operational status. Completed sub components can then report in as part of a higher level community to work with other Talkers™ at that level. In this way a complete Manifest can be fulfilled with accuracy prior to storage, use, or shipment.

E. Airframe Assembly and Avionics

By the use of self-configuring MachineTalker™ units in the cableless production of airframes, miles of wire will be eliminated, weight will be minimized, reliability will be increased, and electrical components will be quickly and inexpensively installed or removed. As the components are mounted in place the Talkers™ in the system will perform a self-diagnosis. Those same Talkers™ can keep the system from going operational if they find something wrong. The Talkers™ thus form a sub-assembly network that evaluates and determines the operability, completeness, sufficiency, etc. of the sub-assembly.

With aircraft sub-system profiles known to the Talkers™, pre-flight checks can be automated and adjustments made to ready the aircraft for takeoff more quickly and accountably than present day manual procedures. In like manner, the conventional pre-landing checklist can be carried out by the Talkers™ which can check seat belts, brakes, gas, undercarriage, mixture, power settings to establish and report that all are in the proper pre-landing positions.

The use of MachineTalkers™ in aviation produces many benefits, including: reduced labor costs due to shorter maintenance times; improved reliability due to electronic confirmation of functionality with rapid scanning of parameters more frequently than humanly possible; and reduced cost of components due to the elimination of wire harnesses.

Because avionic MachineTalkers™ can operate via data over power lines and without multiple conductor cable harnesses, there is significant improvement in safety during combat. There are no wires to be cut, broken or damaged and when the Talkers™ are programmed accordingly, all systems are controlled by Talkers™ at the point of use.

F. Security and Access Control

One example where both stationary and moving MachineTalker™ devices are applied is the tracking of individuals with varying security clearances throughout a building having varying security level areas. MachineTalker™ medallions worn by those individuals or attached to assets in motion will talk to stationary MachineTalkers™ placed throughout a facility. The stationary Talkers™ can monitor and report on the whereabouts, past movements, and proximity to areas of higher or lower security of the person wearing the medallion.

Access to locations or assets may be granted or denied automatically and the MachineTalker™ community can anticipate the likelihood of an individual's or an asset's progress toward various potential destinations. Equipped with voice or text/display capabilities, the MachineTalker™ community can query or instruct an individual.

Other attributes of the individual's or asset's presence may be automatically accessed, analyzed and reported. These can include the duration of stay, exact record of movements in time, deviation of access/time pattern from the norm (i.e., behavioral data), identification of access to assets located in the facility, movement/time of assets located in the facility, and monitoring of other data relative to individuals like heart rate or asset battery condition in relation to time/location/movement within the facility.

G. Laundromat

MachineTalkers™ are expected to be used in general applications where intelligent representation of a number of machines will result in significant cost savings through efficiency of operation.

A typical laundromat/fun center might operate 30 washers, 30 dryers, 5 product vending machines (soap, bleach, drinks, food), and 5 entertainment machines (video, games, the Internet). Each one of these machines can be made into an intelligent host by the attachment of a MachineTalker™. In this example, the laundromat owner will purchase and install MachineTalkers™ on pay stations and on every machine.

The entire system will self-configure when powered up and will report its operational status to the owner who can watch the process on a display, either locally or from some remote location.

Customers may pay by credit card, cash, cell phone, PayPal®, and other means that the owner might employ. Once paid, the system can provide the customer a pin number, biometric permission (fingerprint, retinal scan or the like), radio frequency identification ("RFID"), or a charged medallion to start washing, eating, and playing in the laundromat/entertainment center. The owner is able to monitor cash and performance of the laundromat on a real-time basis and can also check security from Talkers™ associated with protective devices like locks and video cameras.

H. Using SMMP™/XML Protocol

To simplify the programming of the sometimes complex operations that are conducted by MachineTalkers™; and to promote the display of inventory and audit information at central sites concerned with remote clusters of MachineTalkers™, SMMP™ is adaptable to interact with programmers using the well-defined, efficient, and popular XML and HTML protocols.

When described in XML or HTML, graphics and vector objects require much less download time as compared to a bitmapped image. Fine gradients, transparencies and colors would otherwise require a 256 color palette to describe.

A typical 90 dpi, 6×6 inch image would consume nearly 855 kilobytes as a bitmap ("BMP") image and would compress to about 285 kilobytes in the graphics interchange format ("GIF"). Alternatively, using vector objects from XML or HTML will reduce this by a factor of 40, or down to about 7 kilobytes for an entire page without lossy compression algorithms and the resulting loss of resolution.

Using the MachineTalkers™ with their SMMP™/XML, text-based data will not only pass quickly between remote sites but due to the features of XML can be just as easily displayed as Excel spreadsheets or as a browser-based applications.

I. Mass Transit and Access

Mass transit systems are easily retrofitted using MachineTalkers™ that allow customers to have access when they carry a pre-programmed medallion, or a Palm Pilot PDA, or who are willing to use biometric readers. In this case, turnstiles with MachineTalkers™ will open without delay, subject to the customer's valid medallion or PDA being debited.

To assure safety and security, the physical location of transit police will be tracked on the fly by MachineTalkers™ mounted in locations throughout the transit station. Because the Talkers™ can control all types of processes police can use them to command the closure of station access doors, or close and lock subway doors, learn the location of other police, and alert and communicate with one-another using MachineTalker™ enabled devices.

J. Home Automation

A MachineTalker™ based Home Automation System can be configured by the addition of Talker™ modules onto water heaters, refrigerators, washer/dryers, lawn irrigation equipment, and utility meters. From the moment the system is powered up, there will be energy savings due too, for example with time based metering of electricity, the control of irrigation by Talker™ enabled soil moisture detectors, and the local control of water heater temperature during late night hours and during the day when no-one is home. Variations can be asserted by the homeowner from remote sites over network connections to resident MachineTalkers™. Because the community of Talkers™ are self-aware, should any system fail, the Talkers™ can be programmed to contact the owner and/or the appropriate maintenance or emergency personnel.

K. General Cable Elimination

The ability of Talkers™ to self-configure interconnection between themselves permits the bringing together of sub-assemblies, each represented by its own Talker™, to be interconnected without cumbersome cables in both a wireless configuration or data over power that only requires a power wire connected to each separate entity in this community. Such a community of Talker™ represented entities, machines, or devices can range from a small-sized grouping of electronic components (e.g., MicroTalkers™) up to larger assemblies like automobiles or airframes (e.g., MacroTalkers™). The elimination of multi-wire cables saves significant costs in first-time assembly, in the replacement of sub-assemblies in the field and in troubleshooting for repair. Swapping out sub-assemblies is as easy as disconnecting and re-connecting a power source. Even that step can be eliminated where the sub-assemblies with their self-starting Talkers™ include battery power.

L. Parking Systems

One difficulty with large parking facilities is that locating an empty space for a vehicle is a linear searching process. The problem with conventional methods for identifying empty spaces is that they are expensive, inefficient, labor intensive, and difficult to maintain.

Combining a low-cost magnetometer for vehicle detection with a stand-alone MachineTalker™ unit and placing one of these combined packages in the pavement under every parking space (or on the surface of the pavement) permits the reporting of space available and localizes the processing of other actions related to the vehicle and its driver, including the measurement of time, collection of fees, and imposition of over-limit fines.

In general, most parking facilities have either a person or a paystation machine for collection of fees and issuing a permit to park. Most parking facilities also have a roving attendant who looks for vehicles where time has expired so that a fine can be imposed. Various methods are used to indicate compliance, like stickers and tickets displayed in the window of vehicles. All of these are very time consuming and expensive to support.

The network of MachineTalkers™ can include Paystations at the entrance or at strategic locations within the parking facility, Displays for space available, Displays for over-limit reporting, and the capability to coordinate all operations within an attended or unattended facility. Long-term users can be sold a medallion™ (a roving Talker™) that will communicate with the local Talker™ network to indicate pre-paid status.

Because this community of MachineTalkers™ is a wireless network of intelligent processors, reports can be detected remotely and the roving attendant need not enter the facility at all if there is no indication of over-limit or a report of equipment malfunction. Similarly, many other features associated with the parking industry like policing of warrants, attaching of immobilizing boots (that can also contain a Talker™ for forcing payment), the use of pre-assigned spaces (with corresponding Talkers™ in the pavement and on the car), and spaces restricted for particular use are all subject to automatic controls and reporting to central authorities.

The versatility afforded by a MachineTalker™ based parking system allows the owner-manager of a public or private system to incorporate all forms of payment like credit cards, debit cards, bills, coins, and medallions™; and the capability to program numerous configurations for servicing customers.

Additionally, a Talker™ may be incorporated into the various parking meters in a parking garage or on city streets. Advantageously, a mobile parking patrol can be equipped with a corresponding Talker™ so that the Talkers™ with unpaid occupied parking spaces wirelessly notify the mobile parking patrol that a parking ticket is in order. In this fashion, visual display of payment is unnecessary and visual obstructions do not prevent or delay processing by the mobile parking patrol. A benefit of such a Talker™ equipped mobile parking patrol system is that the individual routes for each mobile parking patrol unit can be expanded to cover more territory, thus reducing the number of employees and vehicles required while maintaining or increasing revenue generated from issuing parking tickets.

While the particular self coordinated machine networks herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A self coordinated machine network encompassing at least one community of machines, characterized by;
   means for individual machine determination of identity in a network community,
   means for individual machine determination of function in the community,
   means for storage in individual machines of information; and,
   a communications link between individual machines and the network wherein,
      the information includes;
         programming information for the machine and other machines on the network,
         machine characteristics for the machine and other machines on the network, and
         machine status and condition for the machine and other machines on the network;
      whereby;
   machines on the network are adapted to operate as members in a community of equals, whereby members can relay information through each other or communicate directly to other members or the outside world, and can use the information, to initialize, program or re-program new members, and share all pertinent information about the personality and status of all members in order to constitute a distributed decision making and processing system.

2. The network of claim 1 wherein at least one machine's communications link is a wired link.

3. The network of claim 1 wherein at least one machine's communications link is wireless.

4. The network of claim 3 wherein the wireless link is a radio link.

5. The network of claim 3 wherein the wireless link is infrared.

6. The network of claim 1 wherein each machine in a community has a peer-to-peer relationship to other machines in the community.

7. The network of claim 1 wherein each machine communicates with the other machines on the network through a router.

8. The network of claim 1 wherein at least one machine in the community comprises;
   a specific purpose portion,
   an intelligent processing and communication device portion for communicating with the community; and,
   an interface between the specific purpose portion and the intelligent processing and communication device portion.

9. The network of claim 8 wherein the interface is at least one of;
   a two wire interface,
   a multiwire interface,
   a multiplexed wired interface; or
   a wireless interface.

10. The network of claim 1 further comprising at least one of;
   a control station in communication with the network,
   a user interface station in communication with the network; or,
   a service station in communication with the network.

11. The network of claim 10 wherein the user interface station communicates with the network through the control station.

12. The network of claim 11 wherein the user interface station and the control station are built as one unit.

13. The network of claim 10 wherein the control station is remote from the community.

14. The network of claim 10 wherein the control station communicates with more than one community of machines.

15. The network of claim 10 wherein the service station is selected from the group which includes;
   laptop computers,
   palm computers,
   personal data assistants, and
   cell phone devices.

16. The network of claim 1 wherein a machine contains memory segmented into areas reserved for information about itself and areas reserved for information about other members of it's community, such that machines in a community contain enough information about other members to initialize other members when they join or re-join the network.

17. The network of claim 16 wherein the information in the memory segments consists of at least one of;
   machine personality,
   machine specific programs; or,
   machine features.

18. A self coordinated network encompassing at least one community of entities or machines, comprising;
   at least one intelligent device affixed to at least one host machine or entity whereby the intelligent device serves as a proxy for the host machine, representing characteristics of the host machine or entity to the outside world, wherein the network is characterized by functions including one or more of:
   individual machine determination of identity in a network community,
   individual machine determination of function in the community,
   storage in individual machines of information; and,
   a communications link between individual machines and the network wherein,
      the information includes;
         programming information for the machine and other machines on the network,
         machine characteristics for the machine and other machines on the network, and
         machine status and condition for the machine and other machines on the network;
      whereby;
   machines on the network are adapted to operate as members in a community of equals, whereby members can relay information through each other or communicate directly to other members or the outside world, and can use the information, to initialize, program or re-program new members, and share all pertinent information about the personality and status of all members in order to constitute a distributed decision making and processing system.

19. The network of claim 18 wherein the host characteristics include one or more of;
   inventory,
   profile, or
   actuator status.

* * * * *